US011964210B2

(12) United States Patent
Natali, Jr. et al.

(10) Patent No.: US 11,964,210 B2
(45) Date of Patent: Apr. 23, 2024

(54) SYSTEM AND METHOD FOR GAMEPLAY AND SIMULATION OF INVESTMENT PERFORMANCE AND FINANCIAL GROWTH OVER A PERIOD OF TIME

(71) Applicant: Troutwood, LLC, Pittsburgh, PA (US)

(72) Inventors: Eugene M. Natali, Jr., Pittsburgh, PA (US); Jeffrey Richard Davidek, Pittsburgh, PA (US); Dorian Brown, Pittsburgh, PA (US)

(73) Assignee: Troutwood, LLC, Pittsburgh, PA (US)

(*) Notice: Subject to any disclaimer, the term of this patent is extended or adjusted under 35 U.S.C. 154(b) by 312 days.

(21) Appl. No.: 17/548,064

(22) Filed: Dec. 10, 2021

(65) Prior Publication Data

US 2022/0184505 A1 Jun. 16, 2022

Related U.S. Application Data

(60) Provisional application No. 63/123,740, filed on Dec. 10, 2020.

(51) Int. Cl.
*A63F 13/80* (2014.01)
*G06Q 40/06* (2012.01)

(52) U.S. Cl.
CPC ............ *A63F 13/80* (2014.09); *G06Q 40/06* (2013.01); *A63F 2300/8094* (2013.01)

(58) Field of Classification Search
CPC .. A63F 13/80; A63F 2300/8094; A63F 13/35; A63F 13/65; G06Q 40/06
USPC ........................................ 463/42; 705/39, 40
See application file for complete search history.

(56) References Cited

U.S. PATENT DOCUMENTS

| | | | | |
|---|---|---|---|---|
| 2008/0027880 | A1* | 1/2008 | Yu | G06Q 40/06 705/36 R |
| 2018/0315341 | A1* | 11/2018 | Patak | G09B 19/18 |
| 2019/0164453 | A1* | 5/2019 | Patak | A63F 13/65 |

* cited by examiner

*Primary Examiner* — Pierre E Elisca
(74) *Attorney, Agent, or Firm* — Barley Snyder

(57) ABSTRACT

A system and method for presenting a financial simulation is provided having a computing device with a graphical user interface, and the simulation providing a plurality of turns during which an option is provided, for each of the plurality of turns, to have a simulated amount invested into a simulated investment account; sold from the simulated investment account and directed to a simulated non-investment account; or directed to a simulated non-investment account, whereupon any existing invested amount remains in the simulated investment account; and each of the plurality of turns has a simulated market return applied to the simulated investment account to provide a new simulated investment account amount.

21 Claims, 23 Drawing Sheets

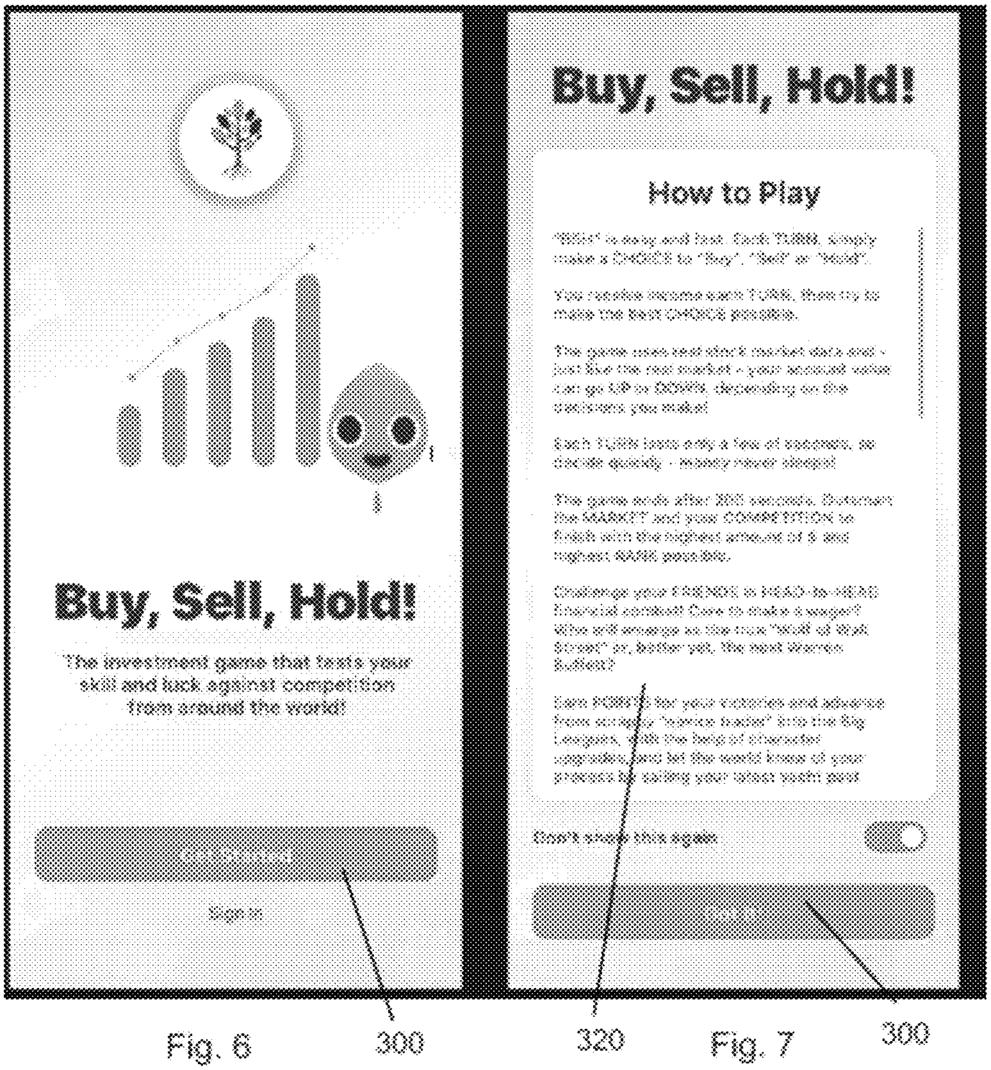
Fig. 6 300 320 Fig. 7 300

360

300

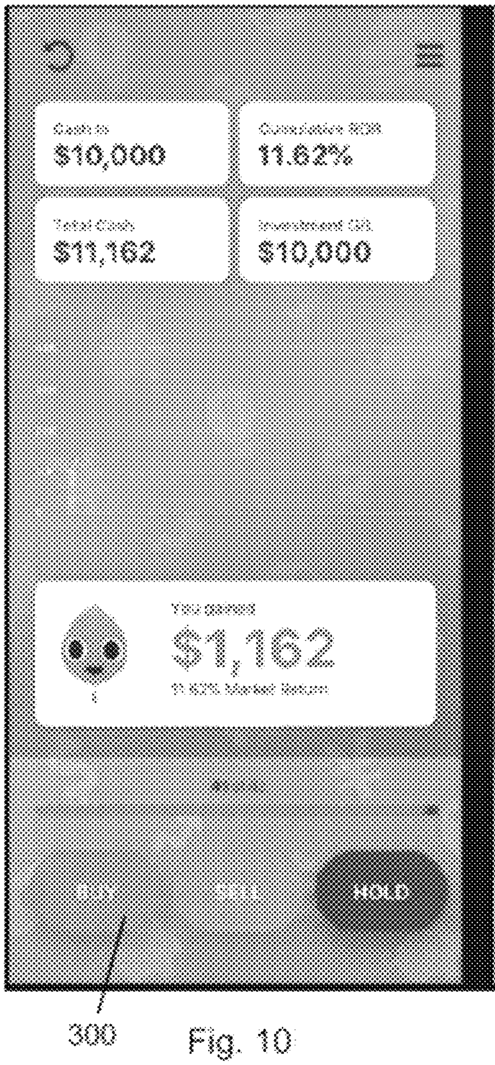
300 Fig. 10
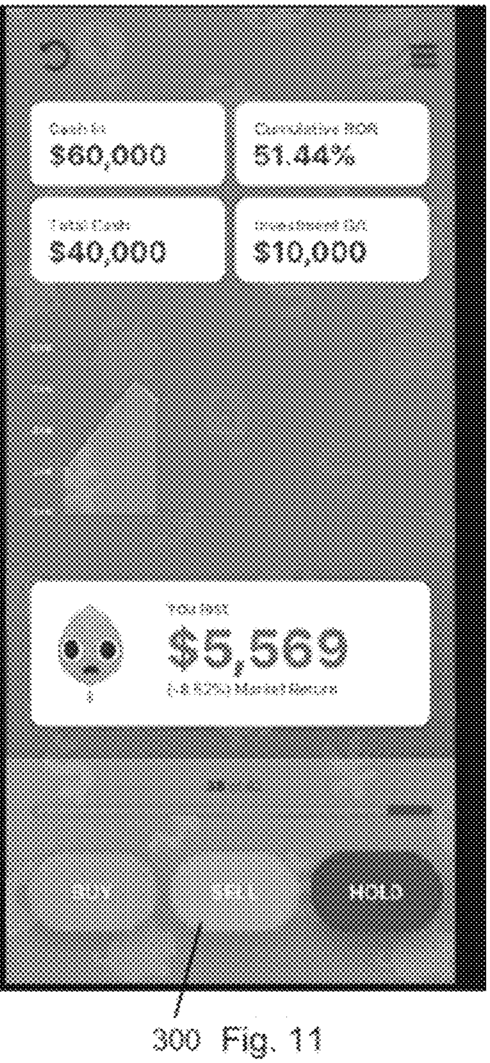
300 Fig. 11

Let the game begin! 322

There are 42 investment decisions in this game. Just like when investing for real, your account value can go down as well as up, depending on how you choose.

Hey I'm Finn! I'm the purple line, can you beat me?

300

300

SYSTEM AND METHOD FOR GAMEPLAY AND SIMULATION OF INVESTMENT PERFORMANCE AND FINANCIAL GROWTH OVER A PERIOD OF TIME

CROSS-REFERENCE TO RELATED APPLICATION

This application claims the benefit of U.S. Provisional Patent Application No. 63/123,740, filed on Dec. 10, 2020.

FIELD OF INVENTION

This disclosure relates to financial investment education and, more particularly, to financial investment education by simulating actual stock market investment performance, and the impact of investment decisions, as it relates to the choice of buying, selling, or holding of investments in the stock market. As taught herein, Applicant seeks to provide a simulation and game to model the results of financial investment decisions in a fast-paced simulation game. The games uses actual historical stock market returns from selected prior years, and each cycle of game play is comprised of multi-year chronological sequences. This is important because it teaches players how markets function, by using gamification to teach players how to successfully navigate a long-term investment portfolio.

BACKGROUND

Approximately 115 million Americans do not invest. A decline in traditional pension fund offerings makes it imperative that non-investors learn investing skills. Many people will be responsible for self-administering their 401k or personal retirement plan. Understanding how long-term investing works is critical in terms of addressing this changing retirement paradigm. Financial challenges to the general population are numerous, including a student loan crisis, which continues to worsen. Corporations and even municipal and state governments are freezing and in some cases eliminating their pension plans. The minimum age for Social Security eligibility has risen and may continue to rise as its Trust Fund deficit grows. This cumulative reduction of the United States retirement safety net is an issue of national importance. The demand and need to help Americans, particularly young Americans, develop viable plans to achieve financial stability is very high. What is needed is a system that will help users develop comfort and confidence with regard to investing in financial markets, such as through stock market indices for example.

Previously known stock market games, also known as investment challenges or stock market simulations, are common in U.S. school systems and have been for some time. In these simulations, a user typically creates an account. The account is assigned an arbitrary starting balance of fictitious funds (e.g. $100,000). The user may then choose to Buy or Sell securities, using the real-world ticker symbols (e.g. AAPL), at the current price indicated in the real global stock market. The typical game lasts three to six months and, during that time, the user portfolios experience the returns of the investments they select, similar to a real investor, during that brief period.

When a student user plays a typical investment challenge or stock market simulation, linked to current market data, there is no certainty of what macroeconomic environment will exist during the three month or similarly brief period.

If the broad economy is in recession or the broad stock market in correction, the majority of investment options available to students or users of a traditional simulation are likely to lose value. Under this scenario, users are likely to learn two things: 1) that financial markets are highly volatile, and 2) participating in them is likely to result in loss of money.

Conversely, if the broad economy is in a boom or the broad stock market is soaring, the majority of investment options available to students or users are likely to increase in value. Under this scenario, users are likely to be left with an impression that it is easy to get rich by investing but, to win the challenge, requires trading frequently, using leverage to amplify returns, choosing riskier investments, such as derivatives, and above all, to be an active trader.

The competitive nature of these simulations and games, which typically offer a prize for attaining "first place" does indeed encourage users of the traditional simulation to "go for it". Coincidentally, investors who engaged in this type of behavior are much loved by the financial services industry for their active involvement in the client behaviors which tend to generate the highest levels of fees.

In all cases, the results that winners achieve in a traditional investment challenge are never achieved on a broad scale by investors in the real world, drawing into question the value of the learning outcome. If 200% investment returns cannot be achieved over three-month periods of time, in a way that is teachable to a large cohort of simulation participants, and the lesson of "how to win" is to take risks and engage in behaviors that would ill-suit the majority of investors in real life, once they begin careers, what is the value?

What is needed is a stock market simulation that can, in a short period of time, simulate an extended period of time, utilizing historical market performance of years or decades for the simulation, to avoid being unfairly influenced by short term market volatility, and more accurately represents long term market performance.

SUMMARY

The present invention is an improvement over such traditionally provided stock market simulations and is unique in that, unlike the aforementioned games and simulations through which users observe the consequences of investing during short periods of time—far shorter than a typical career—the invention enables users to simulate long term outcomes, based on historical return streams, that better reflect what could happen over a multi-year or even multi-decade career cycle.

The invention takes a different approach to the function and purpose of a simulation. History shows, particularly over the 90+ year data set of return streams used in the invention, that while short periods of time tend to be volatile and unpredictable, long-term periods of time—such as the span of years akin to a typical career—tend to be stable in trend and essentially predictable in outcome, in a way that can be replicated by most anyone and in a way that is teachable through a simulation.

In an embodiment, there is provided a financial simulation system comprising a computing device having a graphical user interface, and the simulation system provides a plurality of turns during which an option is provided, for each turn of the plurality of turns, to have a simulated amount undergo an action selected from the group consisting of:

a. invested into a simulated investment account;

b. sold from the simulated investment account and directed to a simulated non-investment account; or c. directed to a simulated non-investment account, whereupon any existing invested amount remains in the simulated investment account; and each of the plurality of turns has a simulated market return applied to the simulated investment account to provide a new simulated investment account amount.

In an exemplary embodiment, the simulated market return is derived from historical data, and further the simulated market return for each of the plurality of turns may be derived from consecutive periods of historical data.

In an exemplary embodiment, the simulated market return is derived from system generated market returns, and may be generated randomly.

In an exemplary embodiment, the computing device may be selected from the group consisting of a computer, a tablet, a mobile device, or portable media player. In some embodiments, the system may further comprise at least one of a network and server in communication with the computing device.

In some embodiments, the system provides a simulation having a plurality of turns of any suitable number. In an embodiment, the simulation is provided with one or more turns. In an embodiment, the simulation is provided with at least 10 turns. In other embodiments, the plurality of turns numbers between 10 and 100 turns, inclusive of the endpoints. In some embodiments, each of the plurality of turns represents a simulated period selected from the group consisting of a day, a week, a month, a quarter of a year, or a year. In an embodiment, the system provides a simulation having 42 turns, representative of an average career length of 42 years, with each turn of the simulation representing a year.

In an embodiment, the simulated amount is a numerical value entered upon beginning the simulation.

In an exemplary embodiment, the financial simulation provides feedback on performance for each of the plurality of turns. The feedback may be visual, and includes at least one graph selected from the group consisting of line graphs, bar graphs, and scatter plots.

In an exemplary embodiment, there is provided a method of presenting a financial simulation having a plurality of turns, the method including the steps of:

a. Providing a system comprising a computing device having a graphical user interface, and presenting a simulated cash account and a simulated investment account;

b. Determining a simulated available amount for each turn of the plurality of turns;

c. For each turn, selecting an option from the group consisting of:

i. Investing the simulated available amount into the simulated investment account;

ii. Directing the simulated available amount into the simulated cash account, and selling any amount in said simulated investment account; or iii. Directing the simulated available amount into the simulated cash account, and maintaining any amount in said simulated investment account;

d. For each turn, applying a simulated market return to any amount in the simulated investment account;

In an exemplary embodiment, the method provides feedback after each of the plurality of turns, which may be visual, and includes at least one graph selected from the group consisting of line graphs, bar graphs, and scatter plots.

In an exemplary embodiment of the method, the simulated market return is derived from historical data.

In an exemplary embodiment of the method, the computing device may be selected from the group consisting of a computer, a tablet, a mobile device, or portable media player. Additionally, the system utilized in the method may further provide at least one of a network and server in communication with the computing device.

In an exemplary embodiment, the method provides the plurality of turns, each representing a simulated period selected from the group consisting of a day, a week, a month, a quarter of a year, or a year.

BRIEF DESCRIPTION OF THE DRAWING(S)

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

Figure 5:
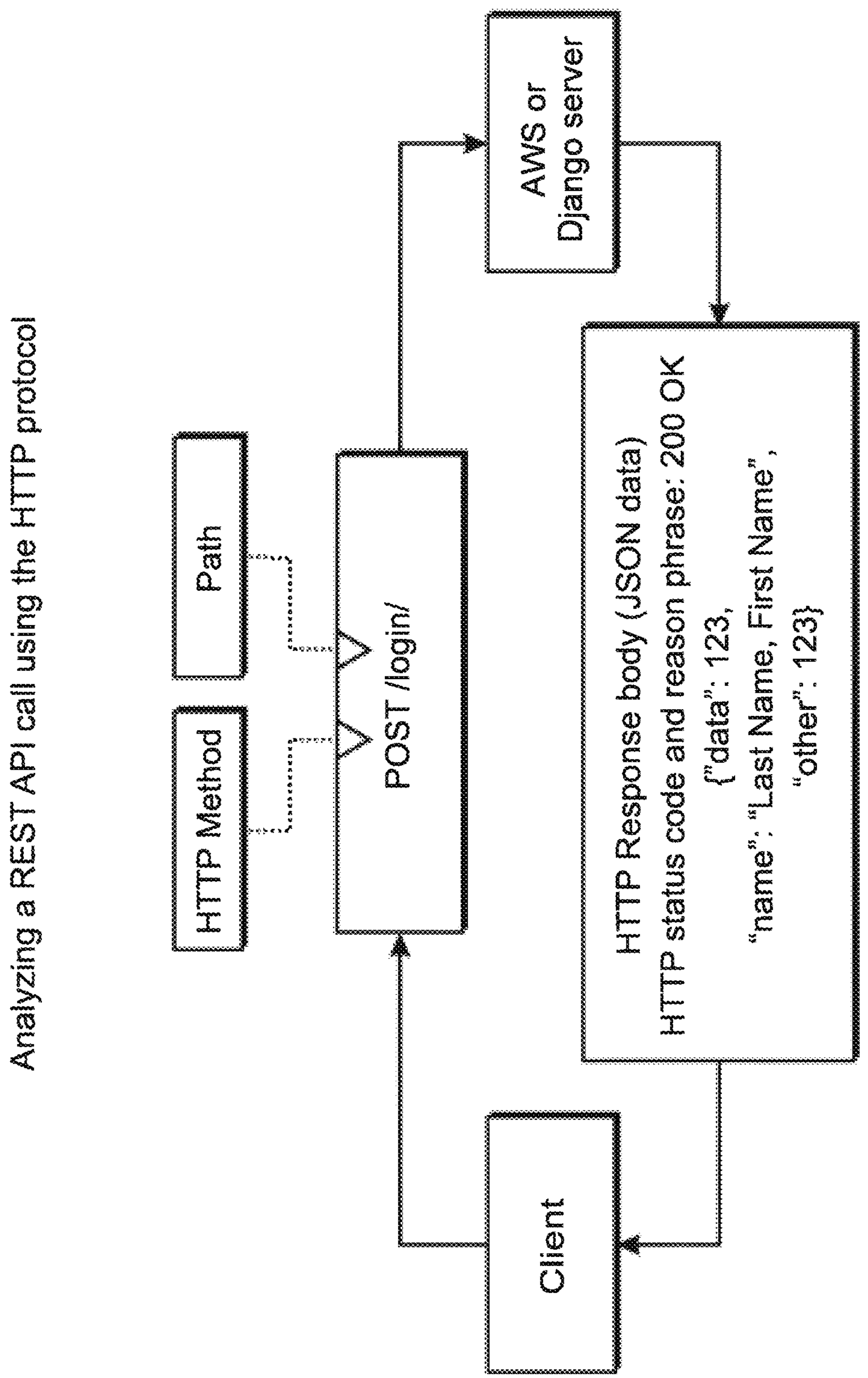

FIG. 5 provides exemplary architecture and protocol for the financial simulation system 100;

FIGS. 6-15 are exemplary images of an embodiment of the simulation providing a graphical user interface and examples of the service modules necessary for performing the tasks of the financial simulation system, according to an exemplary embodiment of the invention; and FIGS. 16-28 are exemplary images of another embodiment of the simulation providing a graphical user interface and examples of the service modules necessary for performing the tasks of the financial simulation system, according to another exemplary embodiment of the invention.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Other systems, methods, features and advantages of the invention will be or will become apparent to one with skill in the art upon examination of the following figures and detailed description.

In an exemplary embodiment, the invention provides a financial simulation system having a financial simulation module, which has a plurality of modules configured to perform actions and calculations needed for the financial simulation module.

In an exemplary embodiment, the financial simulation system provides an interactive game presented to a user, where the financial simulation system is composed of a series of turns, and for the financial simulation, each turn requires the user to make a selection of whether to invest an amount into the stock market, sell an amount invested into the market, or save an amount in a savings account that is protected from stock market losses, but would also be unable to grow as the stock market increases. In such an embodiment, where the financial simulation module may be usefully employed as part of a financial education curriculum, where users can explore the performance of the stock market and make financial decisions regarding investment or saving actions over the course of a plurality of turns, where the financial simulation provides the user feedback demonstrating the impacts of those financial decisions, which feedback may be at least one of visual and aural.

In an embodiment, the teachings herein describe a financial simulation system providing a simulation in the form of a game that allows a user to develop familiarity and confidence in navigating a variable stock market. The financial simulation system provides an entertainment aspect, as the user strives for a better return on investment, or total cumulative value, relative to the performance of others, and relative to the user's results in prior attempts in the simulation. The financial simulation system additionally provides an educational aspect for the user, demonstrating the effect of financial decisions in a stock market having varied return performance. The system may provide a simulation of financial outcomes in response to entered choices during the course of the simulation, regarding the purchase, sale or hold of investment positions. The system may provide for a financial simulation activity that may be utilized as part of an education curriculum, or as part of financial literacy classes. Such a system may beneficially provide users with a better understanding of the impact of financial investment decisions, reduce fear, increase comfort and familiarity with stock market operation, and provide positive reinforcement and communication to help users implement, maintain, and successfully realize their financial plans and goals. Additionally, it is contemplated that the systems may be utilized by investment professionals and financial advisors and may make the system or software for the system available as an educational tool for customers. It is contemplated that the wide distribution of the software or application to users will raise financial awareness among the user population, and serve as a valued resource that drives traffic to social media sites and websites for financial advisers and institutions. Such software may provide potential licensing revenue, as the simulation may be potentially linked to, or incorporated into, major websites and financial advisory portals.

As widespread use of the simulation occurs, and the number of users making choices within the simulation multiplies, the resulting collective data may be usefully studied, and may be collected by appropriate entities, for example, the organization providing or supporting the software. The collected information may include: data on the investment amounts the users select or enter; and details on financial behavior, such as identifying frequency with which users holding or selling, or increasing their investment, and any correlation in choices to market return history. Collected user-input data may be stored via a proprietary database.

The system may access databases and information, such as may contain historical market performance data. Alternatively, they system may provide randomized market results through the course of the simulation. In another embodiment, the system may utilize a mix of random market performance, and historical market performance in the simulation. In another embodiment, the use of random or historical market performance may be user-selectable for each iteration of the simulation, whereby the user determines whether market performance is determined by historical market return data, randomized market return data, or combinations of both.

In an embodiment, the system may be utilized within an educational curriculum in financial matters, or as a form of mentally stimulating entertainment, all while instructing in the area of financial investment skills. In any instance, the simulation could prepare the users or students by providing critical life skills, as running the simulation will demonstrate the impact the choices made by the user may have on their simulated financial outcome. Additionally, the simulation game could imbue future investors with a proper mindset for better weathering financial crises, market volatility, recessions, and economic downturns that may occasionally disrupt the stock market.

The system may be an interactive investment simulation utilizing a graphical user interface that is presented to a display on a computing device utilized by the user. The computing device may be any suitable device or system suitable for receiving and processing information known to those skilled in the art, for example, a computer, a tablet, a mobile device, or portable media player. The user's computing device may have, run, or receive instructions processed by software, such as an application, and perform the necessary calculations and provide the graphical interface instructions locally. Alternatively, the system may provide the users computing device accessing a network, server, or other computing device that runs the necessary processing, such as via an internet connection, or other network connection, where the necessary calculations for the simulation are performed utilizing software located away from the users computing device. In either circumstance, it is contemplated the results through the simulation are presented to the users display. Where the software processes remotely away from the users computing device, for example, the instructions for the graphical display may be reported through a wired or wireless network connection, to be displayed on the users display or device.

The software, which as described, may alternatively be an application on the users computing device, or remotely located and accessed electronically, using techniques known to those skilled in the art, may be provided with, or otherwise access information from an investment information database containing at least historical market performance data, which may be associated by year, or other suitable time increment, such as by month, week, day, hour, as non-limiting examples. The system may provide feedback to the user through the course of the simulation. For example, the feedback to the user may indicate if that user has an invested amount that has increased in value, decreased in value, or has maintained its value, at the end of each turn within the simulation. The feedback may optionally provide encouragement and helpful tips. It is contemplated that the feedback provided through the system may be an alert within the system that the user receives on the display.

In practice, the simulation may typically be provided as a fast-paced game, and intentionally be kept simple by providing limited selection options for the user, in order to facilitate rapid paced game play, while providing output occurrences and events within the system that can readily be processed by a user. Additionally, the simulation provided encouragement to the user, so as to be stimulating and gratifying for the user, in order to maintain user engagement and drive interest in the users own performance within the game.

The simulation comprises the user participating in a series of turns that collectively amount to a completed game. Prior to the first turn, the user may be presented with instructions for proceeding with the game, and may be asked to select a value, which the user would have made available to invest, or save, in each turn within the simulation. The system may provide a default amount, which may vary based upon the nature of the simulation. For example, where the simulation represents 42 years, with each turn being representative of one year, and investment amount of $10,000 may be the default. Alternatively, in an embodiment, the system may provide a prompt to select an amount to invest daily, and the system will adjust the amount available for investment at the start of each turn based on the nature of the time frame simulated by each turn within the simulation. In an embodiment, the system may provide a prompt to select an amount to be invested daily, and provide selection default options for $1, $5, or $10, and optionally, a custom value that may be entered by the user to be available for investment on a daily basis. While the default selection is dollars, it is contemplated that for different market simulations, the currency selection may be adjusted for the region in which the market operates, or where the user is located, such as Euros, pounds, pesos, or any other suitable currency. For example, in an instance where a turn represents 1 year in a simulation for 42 turns, if the user selects a default investment of $1.00 per day, the system will calculate an available investment amount for each turn of $365, as a representative amount to be invested in the simulated year of each turn. In an embodiment, the user may select from a menu of investment amounts to utilize for the simulation. Optionally, the user may begin with a default investment amount in the cash account, that is greater, or some multiple of the amount provided to invest at each turn, representing a lump sum that the user whereby the user buys in when entering the market initially, in addition to the selected amount for each turn. Similarly, if the simulation is for 12 turns, each turn representing one simulated month, and the investment prompt is for $1 per day, the system will provide $30 for each turn to be invested. Subsequently, with each turn, the user is asked to select from “buy”, “sell” or “hold”, as will be discussed.

In an embodiment, the game is to simulate a typical investment career of a user from entry into the workforce, until retirement, where each turn represents one year of the hypothetical investment career spanning 42 years, and thus the simulation provides for 42 turns. It is contemplated that more or less turns may be implemented in the game, and the represented duration of time for each turn may be adjusted accordingly. For example, in another embodiment, where the entire simulation is to represent a year of investment performance, each turn may represent a week, for 52 total turns, or alternatively, each turn may represent a month, for 12 total turns to complete the simulation. In another embodiment, each turn may represent a quarter of a year, with the simulation representing a period of 10 years, the simulation providing for 40 turns. The above mentioned simulations are examples, and it is contemplated that the number of turns, and the simulated periods represented may be varied, and are within the spirit of this disclosure.

Where the rate of return is to be based on historical data, the system may utilize the historical market return information of the relevant form, whether day, month, week, quarter, or year, and for a relevant time period, such that the simulation could be run employing relevant historical performance data. The system may apply historical market return data within the simulation, such as the set of market returns for all years after 1920, or for a limited range of years, such as 1926 to 2019, as non-limiting examples. The historical market return data may be updated periodically, or as necessary to expand the library of return information that may be applied in the simulation. In an embodiment, the system may apply historical market returns for a series of turns that represent a period of consecutive returns from historical precedent. For example, for a simulation having 42 turns, the simulation may apply returns from 42 consecutive years in chronological sequence in the course of completing the simulation, thereby providing an aspect of historical relevance to actual market behavior utilized in the simulation. Alternatively, in another embodiment, the market return data may be selected randomly from the library of market return information for each of the turns.

In an embodiment where the rate of return applied by the simulation is to be based upon randomly generated market performance, the system may randomly generate market return data to assign for each turn, or alternatively, the system may be provided with a database prepared prior to the users selection, containing appropriate randomly generated information that the system may utilize in running the simulation. The parameters for selecting or preparing the random market return dataset utilized by the system may be guided by statistical review of prior market data to develop the relevant distribution and magnitudes of return values for each relevant period, such that the randomly generated numbers may genuinely simulate or reflect average or possible rates of return that are representative of, or comport with expected returns, such that the simulation would be credible.

In an embodiment, the simulation may apply a selected return selected from the library of historical returns available within the system, and apply a selected return to each turn, so that each of the turns within the simulation would have a simulated return based on prior historical precedent records for the market, matching the time period being simulated. In an embodiment, the simulation may allow the user, or another than oversees the simulations, to elect the nature of the financial circumstances, rather than a random simulated historical return; in such an instance the simulation may apply an “average” return based on historical data, a “best” return based on optimistic rate of return, based on historical rates of return, or a “worst” return based on a pessimistic rate of return. In addition, the system may randomly trigger a market crash, with an associated negative return on invested amounts; it is contemplated that the system or a game overseer may be able to proactively push a stock market crash or financial crisis within the software, which may be triggered as part of the instruction events possible within the simulation.

For each turn of the simulation, the user is to step into the role of a simulated investor in the stock market. In order to minimize game complexity, the investor is presumed to have a single investment form, for the duration of the simulation. For example, through the course of the simulation, the user may have a simulated investment in a stock market index, such as the S&P 500, or other suitable market index fund. It is contemplated that the user may select prior to the game to vary the nature of the investment, where the user can select from a variety of index funds or even individual stocks in which to invest for the duration of the game. The system database would present options, or be provided with updated information, to accommodate any number of investment vehicles, where historical or relevant randomly generated returns would be utilized in running the simulation.

Figure 1:
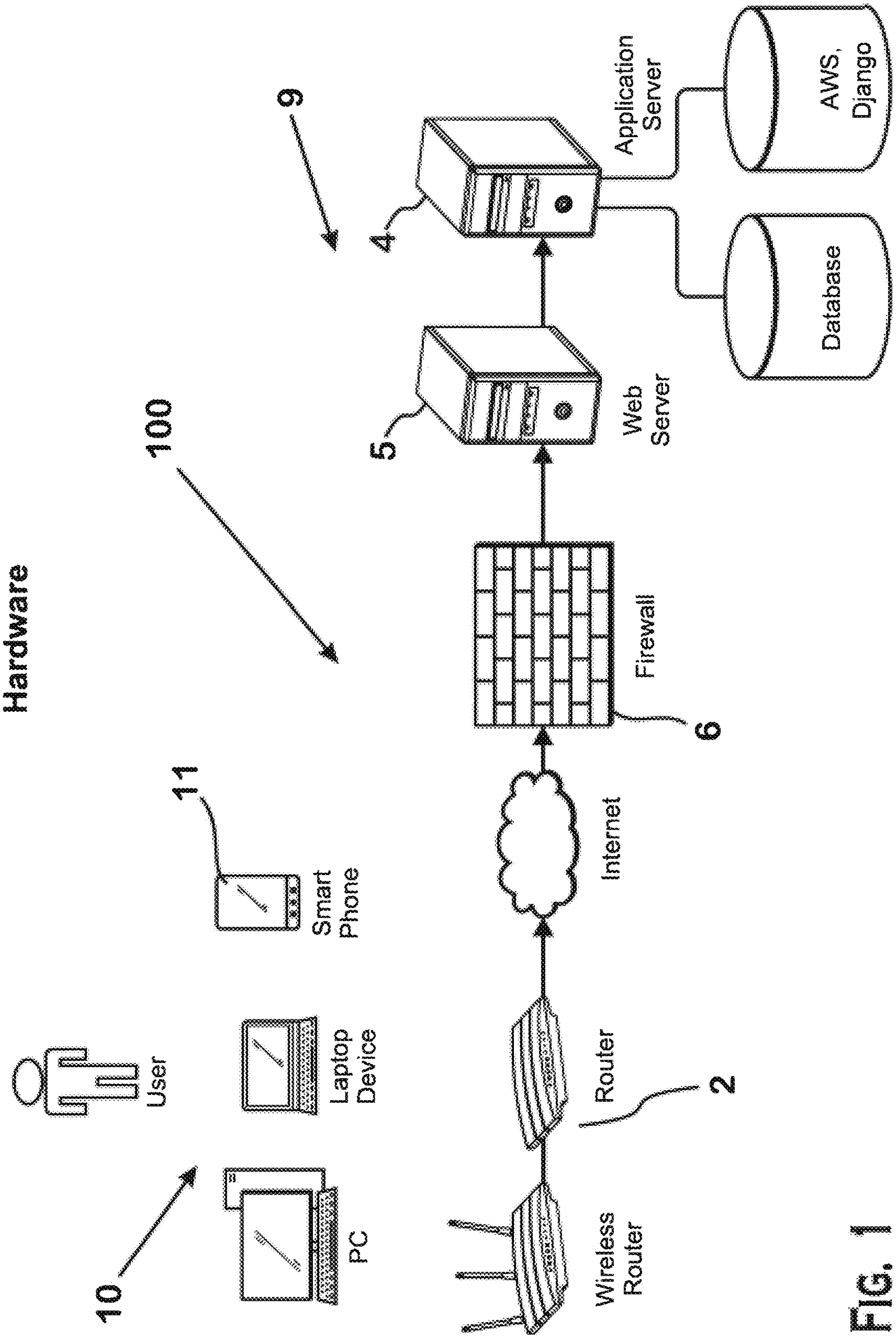
FIG. 1 is a schematic diagram of hardware infrastructure for a financial simulation system according to the invention.

With reference to FIG. 1, the financial simulation system provides, or is configured to access a database, which contains electronic files representing financial simulation information for access by one or more users, who may view the information on any suitable display format, including screen displays of a computer, cellular phone, tablet, etc.

With reference to the figures, various aspects of the hardware, modules and methods of use of an exemplary embodiment of the investor feedback system are further described.

The hardware infrastructure for an embodiment of financial simulation system 100 will be described. In an exemplary embodiment, the hardware infrastructure has a system architecture utilizing some or all of the hardware depicted with reference to FIG. 1. In an embodiment, the financial simulation system is built on one or more network routers 2 (for instance, a wireless router) and connected to an application server having access to one or more databases files, and optionally to an AWS (Amazon Web Services) server, or Django server, while also utilizing known hardware components, including a web server 5, a firewall 6, a network 9, and the computing device 10 of the user. It is contemplated that, in an embodiment where the user's computing device 10 is a terminal such as a PC or laptop, for example, the computing device 10 may be directly connected by a network communication cable to the router 2, and the wireless router depicted may not be necessary. More commonly, the user end of the network 9 is provided with a computing device 10 that is a laptop, PC, tablet, or smart phone that can communicate wirelessly, and access the internet through a wireless communication system, such as a wireless router, that may connect directly to the internet, or be directed through a network router 2 in order to access the internet, as shown in FIG. 1. In an embodiment, the computing device 10 may be a tablet computer or smart phone with a touchscreen display 11. The touchscreen display 11 may use finger or stylus gestures to navigate the general user interface (GUI) provided on the screen by the software. However, one skilled in the art should appreciate that other implements could be used; including a computer mouse, a keyboard, or joystick. In fact, one skilled in the art should appreciate that the computing device may be a physical computer and could be, but not limited to, a desktop computer, a laptop computer, or a cell phone, and utilize a downloaded app or web browser. The computing device 10 is to be provided with memory device that is a storage device having computer components and recording media used to retain digital data. The processor of the computing device is a central processing unit (CPU) that manipulates data stored in the memory device by performing computations. In an embodiment, the financial simulation system provides for interaction and communications between the graphical user interface and the display visible to the user (the front end) and the interactions with the database, or application information (the back end), and example models for such interactions are depicted in the simplified schematic of FIGS. 3, 4 and 5.

Figure 3:
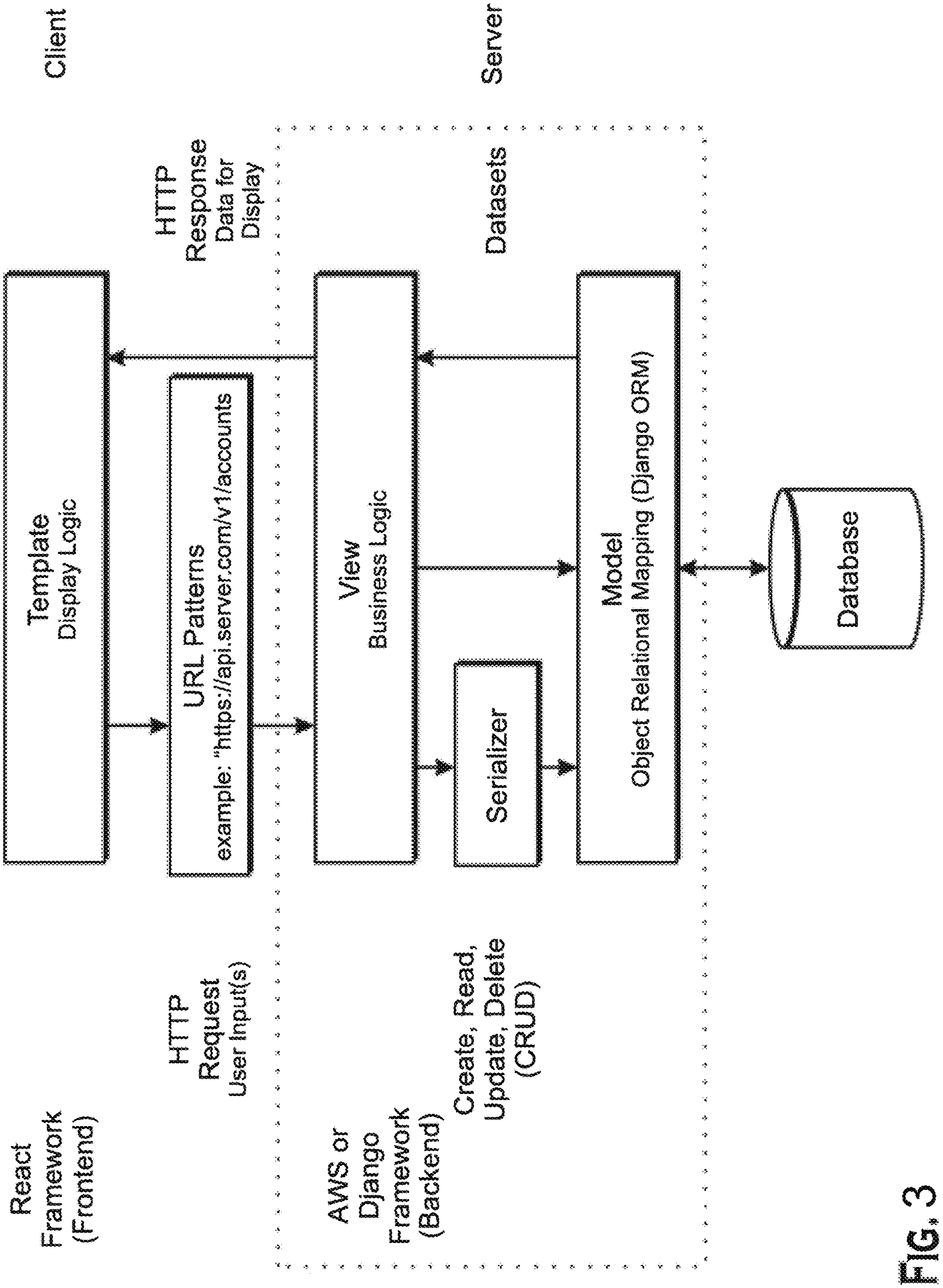
FIGS. 3 and 4 are exemplary embodiments of the front end and back end framework of the financial simulation system 100.

The financial simulation system 100 allows a user to access a plurality of user options through the computing device 10 and a network traffic information on the database application server 4 (i.e., SQLServer or PostgreSQL (also known as Postgres) or newer) that connects to a web server 5. The web server 5 functions as a way for the network router 2 to communicate to the database application server 4, for example, using one or more of an AWS server to access information required for the simulation, or a Django server for communications between multiple computing devices 10 and the database server 4, where the system is to be accessed concurrently by multiple users, for example, as depicted in FIG. 3. In an embodiment, the application database server 4 may be located remotely and utilize AWS or Django servers that can connect to a database file that facilitates electronic access to the financial simulation information, using techniques known to those skilled in the art. A firewall 6 may be integrated for security purposes such as, but not limited to, blocking unauthorized access to the web server 5 and the resulting unauthorized communication thereto. The financial simulation system 100 is designed to run through the computing device 10 utilizing the financial simulation 100 files for the application module 130 or program that are preferably loaded onto the user's computing device 10, such as into the memory 120 of the computing device, and supplemented with information communicated through the network 9 as discussed elsewhere. It is contemplated that, alternatively, the financial simulation files may be downloaded through the network 9 from an application server 4. The financial simulation system 100 is designed to run through the computing device 10, and through a plurality of service modules 160 utilized in the financial simulation system that may be downloaded and function over any suitable network system 9, including personal area networks (PANs), local area networks (LANs), campus area networks (CANs), wide area networks (WANs), metropolitan area networks (MANs) and any new networking system developed in the future. In an embodiment, network 9 may be a set of hardware, software, and protocols that is configured for electronic communication. For example, network 9 may be any one of a global data network (e.g., the Internet), a regional data network, mobile/cellular wireless network, or a local area network. In a preferred embodiment, the network 9 represents a packet-switched network for routing various data. The network uses common high-level protocols, such as TCP/IP and may comprise multiple networks of differing protocols connected through appropriate gateways.

Figure 4:
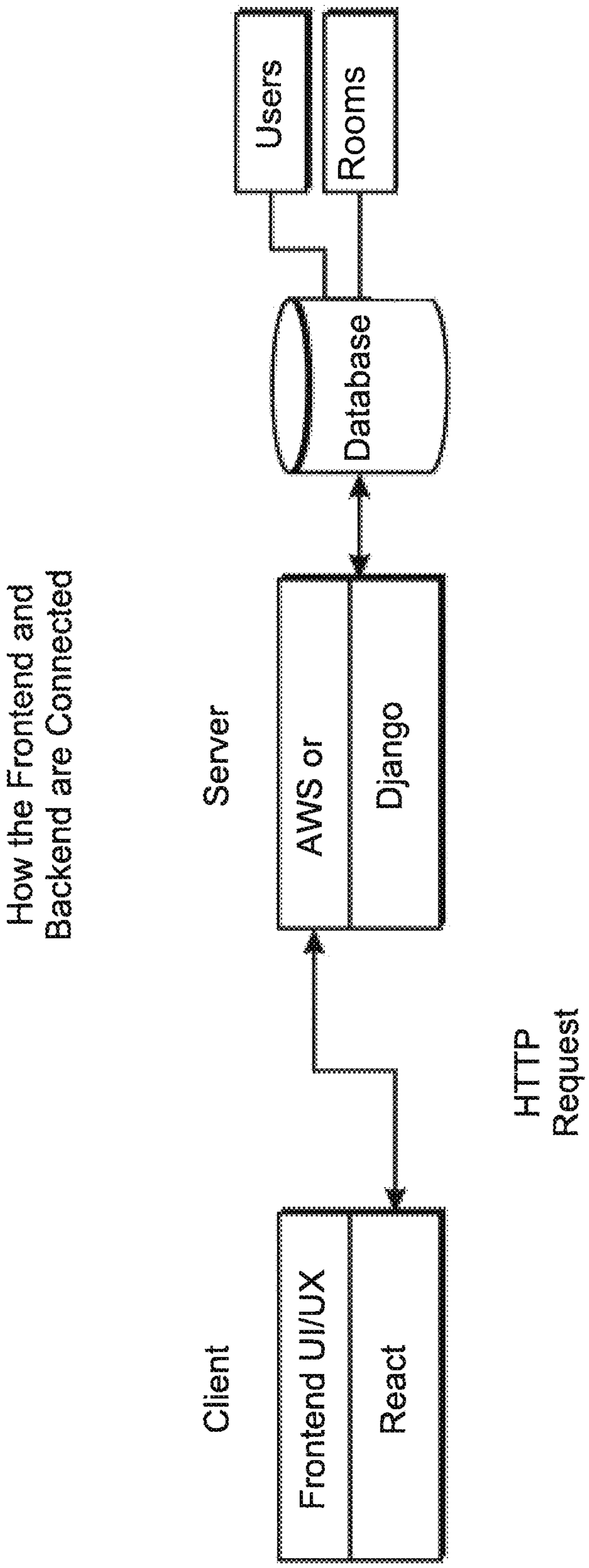

One skilled in the art should appreciate that, in an embodiment, the financial simulation system 100 can be maintained solely through the user's computing device 10, as the necessary information for performing the financial simulation system can be loaded to the computing device 10, e.g., stored in memory 120 of the computing device 10. In such an instance, the user may input user specified parameters required for performing the financial simulation, thereby avoid the need to have the computing device 10 access an external database via network 9. In the shown embodiment, the user may connect to the network router 2 using the computing device 10 and update information through the network 9. In the shown embodiment, the user connects to the network interface using the computing device 10 through the router 2 for instance. FIG. 3 illustrates an exemplary embodiment of the front end and back end framework of the financial simulation system 100. FIGS. 4 and 5 also provide exemplary architecture and protocol for the financial simulation system 100. Though one skilled in the art would appreciate that other hardware and protocol designs are possible as long as such modifications would not divert from the spirit of the invention.

Figure 2:
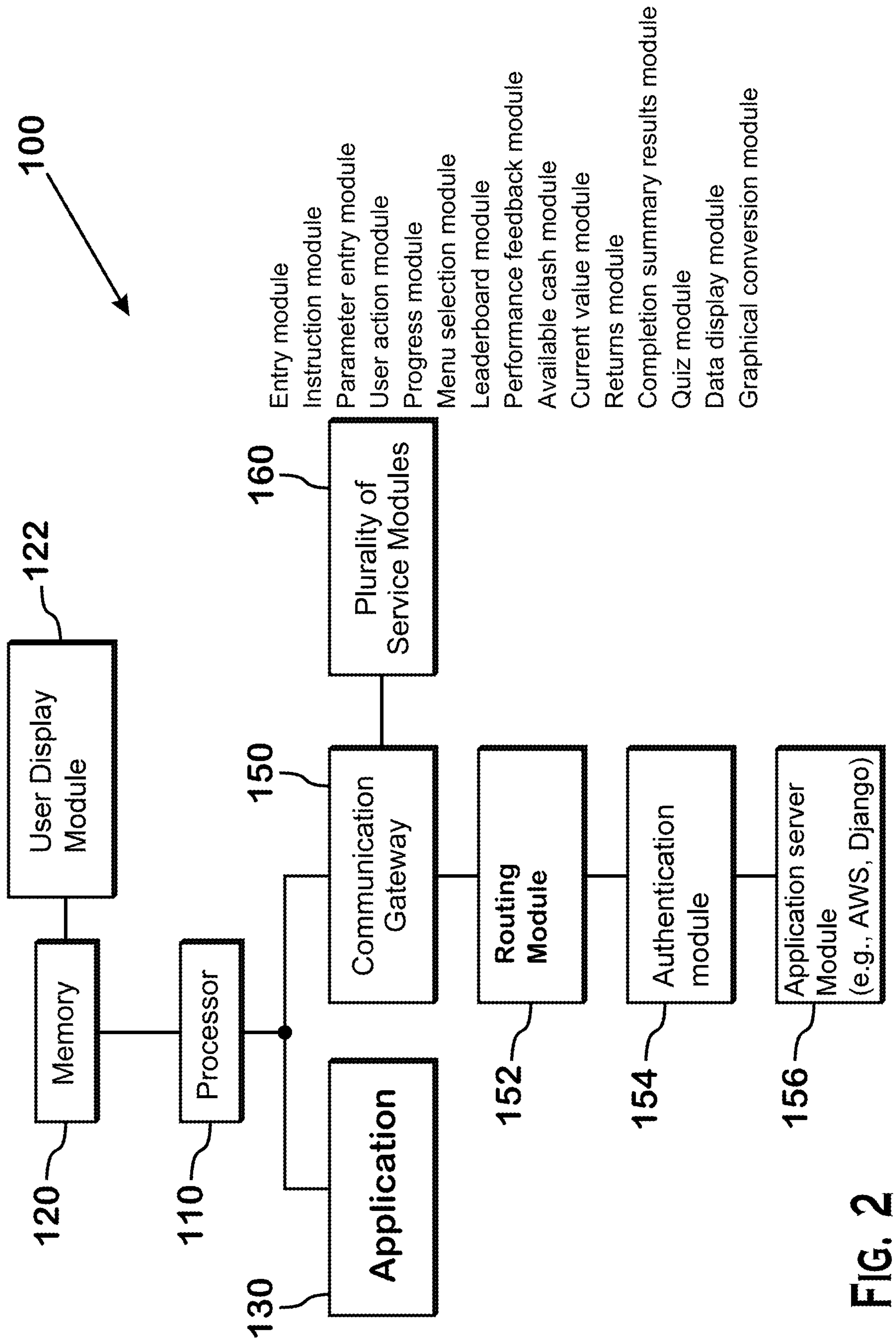
FIG. 2 is a schematic diagram of a financial simulation system according to the invention.

With reference to the schematic depiction of the financial simulation system 100 shown in FIG. 2, the computing device, as discussed above, and as known to those of skill in the art, generally includes a general user interface that can be detected on the display, a memory device 120, and a processor 110.

An exemplary embodiment of the process flow and interactions between component devices for the operation of the financial simulation system will be described with reference to the simplified schematic diagram of FIG. 2. The financial simulation system 100 includes a processor 110, having a memory 120, as may be associated with the computing device described previously, an application database 130, which may also be referred to as the system database.

The financial simulation system 100 provides a financial simulation module that may include several additional modules for carrying out the invention, for example, as depicted in the simplified schematic diagram of FIG. 2. By way of overview, the financial simulation module of the financial simulation system 100 may provide the application module 130 on the computing device 10, such as by being loaded into memory 120, and interacting with the processor 110, to provide a graphical user interface and display to the user display module 122, which may be viewed on the display 11 of the computing device 10, as will be discussed. The financial simulation module provides a communication gateway 150 to facilitate connection and communication between the processor 110 of the computing device 10 (of FIG. 1), through any necessary hardware depicted on FIG. 1, such as routers 2, network 9, internet, cloud, utilizing one or more serves, such as web servers 5. The communication gateway 150 facilitates interaction between the application server module 156, and the application server module 156 on the application server 4. The communication gateway may route communications through a routing module 152 that directs electronic communication between the communication gateway 150 and the application server module 156 to efficiently direct electronic traffic. The ensure authorized access and communication with the application server module 156, the communication gateway 150 may further direct the communications through an authentication module 154 that authenticates the request to access the Application server module 156, which may include one or more of an AWS server, or a Django server, as will be familiar to those of skill in the art. It is contemplated that additional modules may be provided as a plurality of service modules 160 that are utilized in the course of creating user displays and user interactions with the financial simulation module, including: a data display module to render the application performance in a visual manner to the user's display screen 11, a graphical conversion module to create a graphic display of the user's performance within the simulation, such as by preparing a chart or graph; an entry module that provides a welcome display as the financial simulation is initiated; an instruction module that provides a text or graphically displayed message that teaches the user as to how the financial simulation is navigated; a parameter entry module for the user to enter a selected value for use within the financial simulation; a user action module whereby the user selection will advance to the next step in the simulation, and may end the current turn; a progress module to indicate to the user which turn of a series of turns the simulation is on; a menu selection module that allows the user to access menu options within the application, and to review and edit the user profile in the information profile module. In an embodiment, the plurality of service modules 160 of financial simulation system 100 may further provide a leaderboard module that prepares and displays a leaderboard, for example, when operating in a multiplayer mode. In an embodiment, the financial simulation system 100 may optionally provide a quiz module, which may provide for enhancing the educational value and/or challenge of the financial simulation system by posing financial literacy and financial behavior questions to the user periodically throughout the course of the simulation. Within the financial simulation module, there is provided a performance feedback module, having at least an available cash module, a current value module, a returns module that provides feedback on the previous turn selection, such as cumulative rate of return as a percentage, and investment gain or loss. Upon completion of the financial simulation, there is provided a completion summary results module providing graphical and numerical feedback to the user regarding the user's performance within the financial simulation module.

As one of ordinary skill in the art would appreciate, the system 100 may utilize an application server module 156, such as AWS or Django server accessing a database that may be provided on any type of storage device or storage medium, such as hard disks, cloud storage, CD-ROMs, flash memory, DRAM and may include a collection of devices (e.g., Redundant Array of Independent Disks ("RAID")). The information to and from the database can be accessed over a data network 9 as will be described, through respective network connections, for example, in the manner depicted in FIG. 1. These network connections may be any suitable form, including wired or wireless, and may be implemented using any known suitable protocol, as will be familiar to those of skill in the art.

The processor 110 shown in FIG. 2 may be any type of computer processor known to those with ordinary skill in the art and capable of executing the processes described herein. The memory 120 connected to the processor 110 is any non-transitory computer readable medium known to those with ordinary skill in the art including, for example, persistent memory such as magnetic and/or optical disks, ROM, and PROM and volatile memory such as RAM. The memory 120 stores a plurality of algorithms executable by the processor 110. The various algorithms, when executed by the processor 110, implement an authentication module 154 and a routing module 152 of the communication gateway 150 and may also implement the services modules 160 as described in greater detail elsewhere.

The communication gateway 150, in addition to the authentication module 154 and the routing module 152, includes an Application Server Module 156 as shown in FIG. 2. The Application Server Module 156 provides a set of software instructions stored on the system memory 120; having a set of subroutine definitions, protocols, and tools that, when executed by the processor 110, permits communication between disparate software components. In an embodiment, the Application Server Module 156 may be configured to convert electronic data between a JavaScript Object Notation ("JSON") format and an Extensible Markup Language ("XML") format. As would be understood by those with ordinary skill in the art, conversion between other known formats is also possible. In an embodiment of the invention Application Server Module 156 is a AWS Amplify API, with a schematic of the interactions depicted in FIG. 5.

The financial simulation system 100 may employ an financial simulation module utilizing, in an exemplary embodiment, the hardware depicted in FIG. 1. The financial simulation system 100 further relies on actions carried out by a plurality of service modules 160 helpful for carrying out various aspects of the invention, as will be described.

With reference to the figures, the performance of the simulation will be described. FIG. 6 depicts an entry module having a landing page, or a home page that appears as the user first accesses and/or resets the system, such as by opening an application, or web site on a computing device 10, such as a mobile phone, tablet, computer, as non-limiting examples. On the home page, the user may be presented with an option to sign in by logging into the system 100 with a unique identifier, as is known to those skilled in the art. Logging in allows the user to have the performance within the simulation recorded, and available for comparison against previously run simulations, or against other users. Logging in may also allow the system to utilize preferences that the user has previously entered, for example, a user preference for the nature of the investment simulation (whether simulating a period of 1 year, 10 years, or 42 years, as described previously), and the selection of the preferred investment vehicle, or the default investment amount for each turn. It is contemplated that other user specific settings may be retained, and restored within the system upon the user logging into the system.

Figure 16:
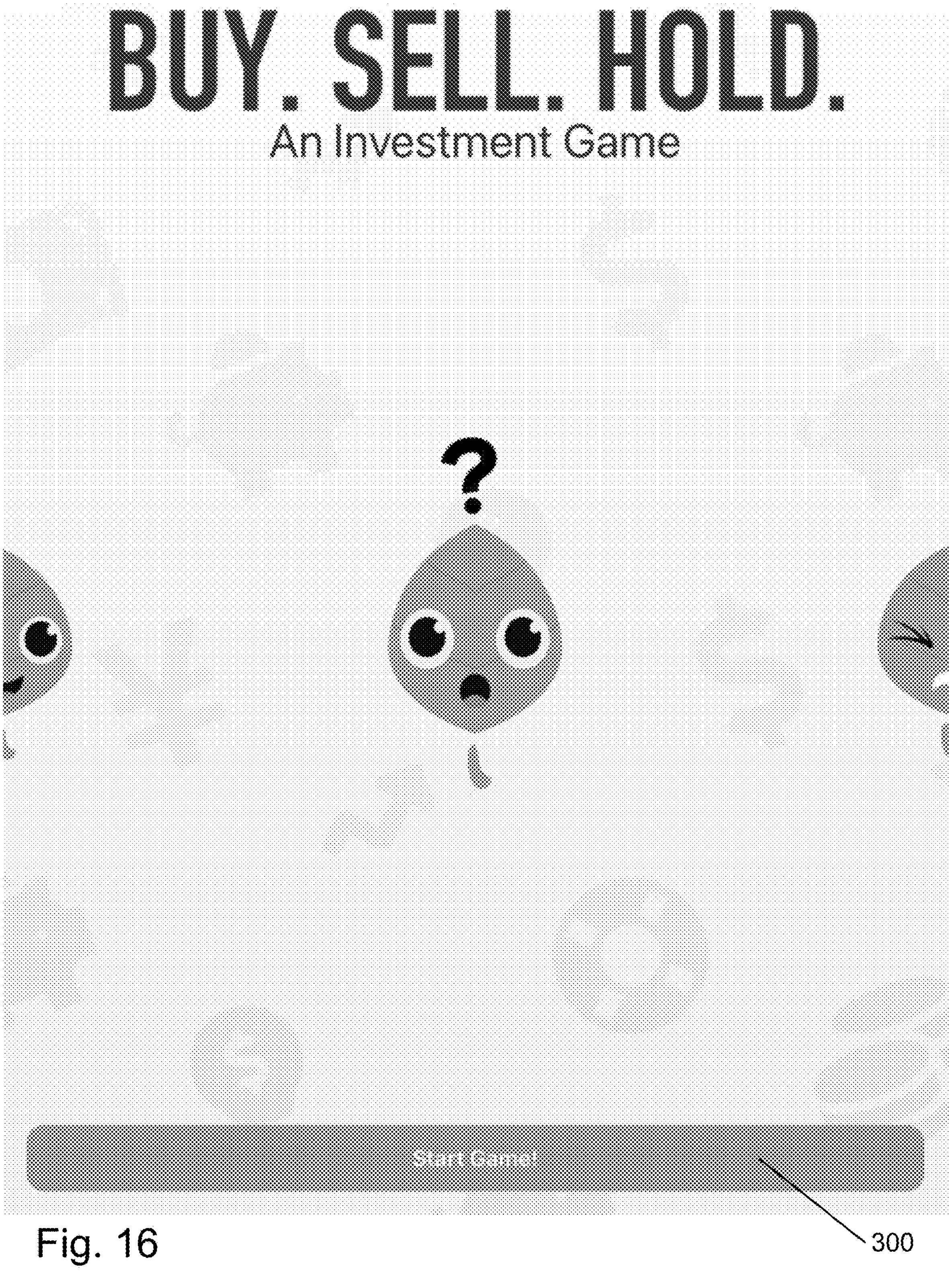

The entry module may provide an alternative landing page for when the system is initiated, which may also be a home page if the system is reset, as depicted in FIG. 16. As shown, the home page is depicted having a user action module 300 presenting a user selectable button to start the financial simulation. Notably, the alternative home page depicted in FIG. 16 is different from that shown in FIG. 6, as it does not provide for the user to log in.

After the user has signed in, or alternatively has selected the option to begin the financial simulation through the user action module 300, without requiring the user to sign in, the system 100 would provide an instruction module that provides an instructions page. The instructions may be text, as depicted in FIG. 7, or may alternatively be presented on the display as a video demonstration, or series of still images, or optionally as an auditory presentation, which may supplement the visual demonstration. In any embodiment, the system 100 provides the optional game play instructions to the user. In an embodiment of the instruction module, the user is provided with an option to avoid seeing the instructions again, such as the "Do not show this again" selectable button. After confirming the instructions are understood, such as by selection of a trigger in the user action module 300, for example the "Got it" button, the display would transition to the image of FIG. 8.

Instructions 320 may be displayed, and for example, may include the following representative text: "How to play. "BSH" is easy and fast. Each turn, simply make a choice to "Buy", "Sell", or "Hold". You receive income each turn, then try to make the best choice possible. The game uses real stock market data and—just like the real market—your account value can go up or down, depending on the decisions you make! Each turn lasts only a few seconds, so decide quickly—money never sleeps! The game ends after 200 seconds. Outsmart the market and your competition to finish with the highest amount of $ and highest rank possible. Challenge your friends in head-to-head financial combat! Care to make a wager? Who will emerge as the true "wolf of wall street" or better yet, the next Warren Buffett? Earn points for your victories and advance from scrappy "novice trader" into the big leagues, with the help of character upgrades, and let the world know of your process by sailing your latest yacht past your friends."

Figure 17:
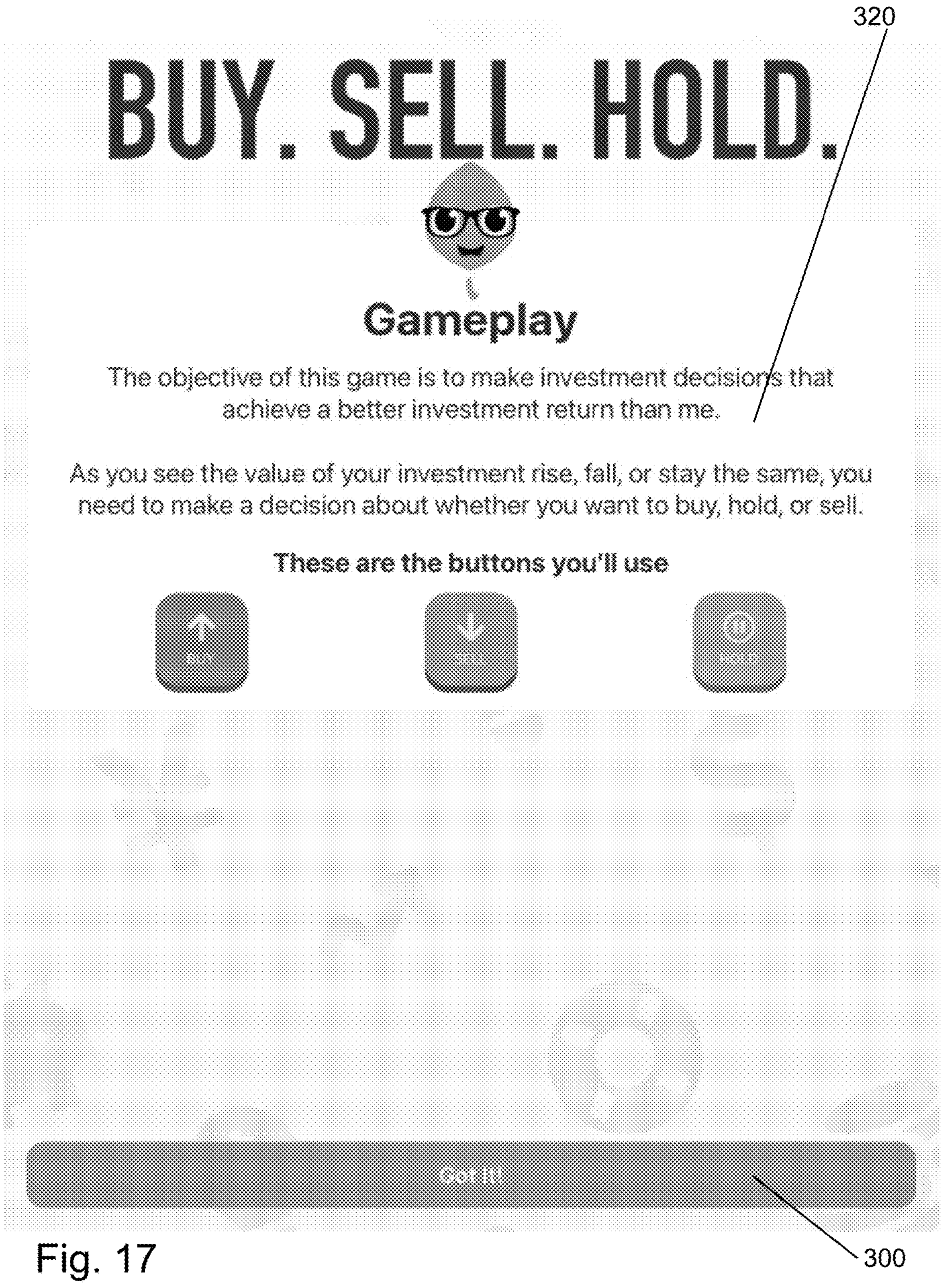

Alternatively, as depicted in FIG. 17, text instructions 320 may be provided along with a gameplay character as displayed, with representative text that reads "Gameplay. The objective of this game is to make investment decisions that achieve a better investment return than me. As you see the value of your investment rise, fall or stay the same, you need to make a decision about whether you want to buy, hold, or sell. These are the buttons you'll use." The above described instructional text is offered as exemplary model text, and it is contemplated that alternative wording may be provided and still fall within the spirit of this disclosure.

In the embodiment depicted in FIG. 17, along with the instructional text, the display will also provide representative images for the buttons that are to be selected by the user during the simulation, including representative images of the buttons that allow the user to buy, sell, or hold. The buy button may further have an upwards oriented arrow. The sell button may further have a downwards oriented arrow. The hold button may further have the double lines within a circle, associated with the meaning of "pause". Additionally, the user can select the action module 300, here displayed as a user selectable button reading "Got it!".

Figure 18:
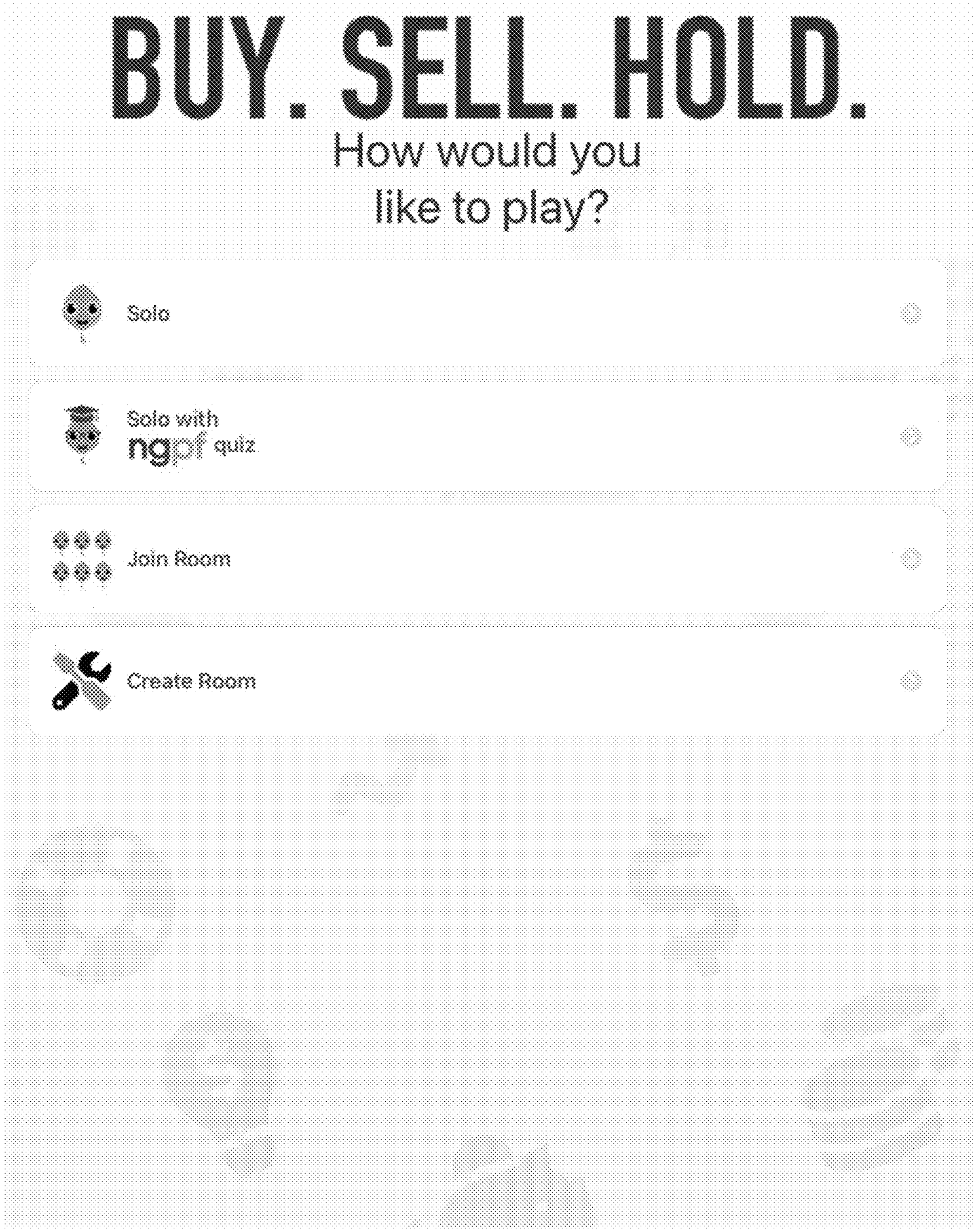

After the user confirms the instructions, the financial simulation system 100 may optionally provide a mode selection module providing a mode selection screen, for example, as depicted in FIG. 18, the user is provided with options to select a "solo" game mode as will be discussed below; a "solo with quiz" game mode; an option to join a multiplayer game by selecting "join room", and selecting the virtual room to which the user has been invited, or be provided a list of possible rooms that can be selected by the user to join; and an option to start a multi-player game by selecting "create room", whereupon the user can invite other players to join the simulation.

A multiplayer game allows the user to proceed through the simulations concurrently, or separately from other users. Each of the games for the each of the distinct users however will utilize the same set of parameters, including the amount to invest daily, and the market return data utilized in the performance of the simulation, whereupon each of the users will run through the simulation in a manner largely similar to the solo game mode, making a selection for investment at each turn of the simulation, and thereby allow fair comparison of the results to the other users, and may be presented in a leaderboard format. Selection of the multi-player game modes (either "Join room", or "Create room") will result in each user utilizing a respective computing device 10 for running the simulation and their respective performance can be compared to other users. Selection of these modes will result in the simulation being run on each user's respective computing device 10, in a fashion largely similar to that of the solo game mode, only during the simulation, the computing device will access the necessary financial simulation information through the network and access the database server, as will be familiar to those of ordinary skill in the art, typically using a Django server, such that the server is able to track the performance of each of the players in the virtual room, and can provide a leaderboard listing of the scores for all of the players involved.

The performance of the simulation will be explained with reference to the solo game mode as the typical game play, as will be discussed below. With minor changes, as noted herein, the solo game play can be adapted for the solo with quiz game mode, as well as the multi-player game modes.

The solo with quiz game mode is similar to the solo game mode, only within the financial simulation, at various points within the simulation, the user will be presented with questions that, if answered correctly, will provide additional simulated investment funds to be provided to the user at the start of the subsequent turn. The questions may be related to financial aspects, for example, financial behavior and financial literacy. In an embodiment, the questions utilize source material prepared by Next Gen Personal Finance (NGPF) but need not be limited to such materials. It is contemplated that a variety of sources and topics may utilized as source material for the quiz questions that are to be presented. The difficulty of the questions may be adjusted, in an embodiment, by the administrator of the simulation, or the administrator may provide custom questions.

Figure 8:
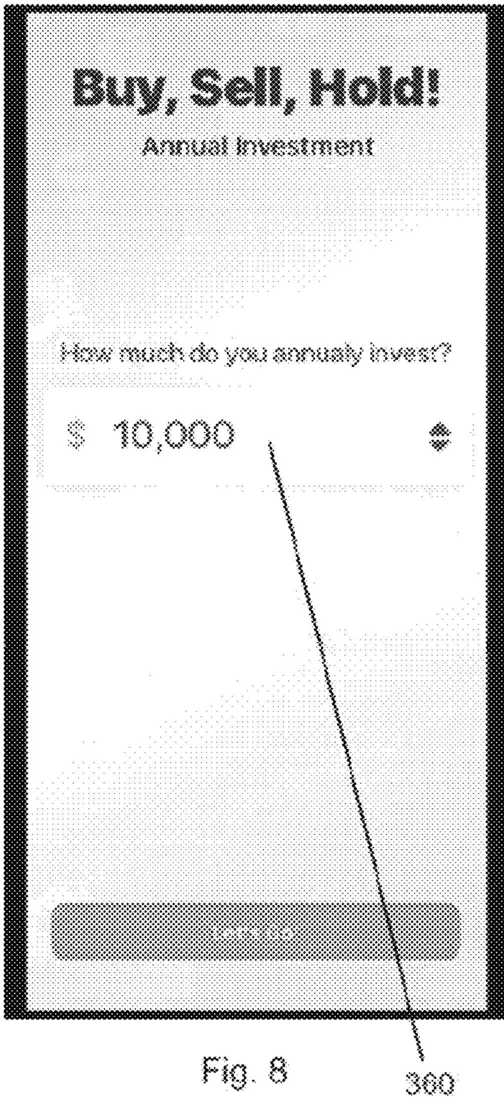

The solo game mode, and the ngpf quiz game mode will both utilize the user's computing device 10, and may access an application server through the network 9 to access a database, as will be familiar to those of ordinary skill in the art, and typically will utilize an AWS server, though for multiplayer simulations, a Django server may beneficially be accessed. The financial simulation 100, while operating in the solo game mode, will now be described. In an embodiment, and as depicted in FIG. 8, the user is completes the parameter entry module, where the user is requested to select a value to invest for each turn. As depicted, in the absence of a selection; the system 100 provides a default amount for proceeding with the simulation. In the exemplary depiction of FIG. 8, the default amount is $10,000 for an annual investment, which may be adjusted to be suitable for the mode of gameplay selected by the user, such as where the simulation is for a year, and the default amount would be adjusted to represent what the user would invest for the simulated duration of the turn, which may be a week, or a month, as non-limiting examples. After confirming the amount to invest, the user may select a trigger through the user action module 300, such as the exemplary "Let's Go!" button depicted, to begin running the simulation.

User entries of information or selections within the system 100 may be made with a user selectable text entry field 360, or other suitable form for text inputs, as shown in FIG. 8, or alternatively, may provide a drop down menu that provides options for choosing an entry.

Figure 19:
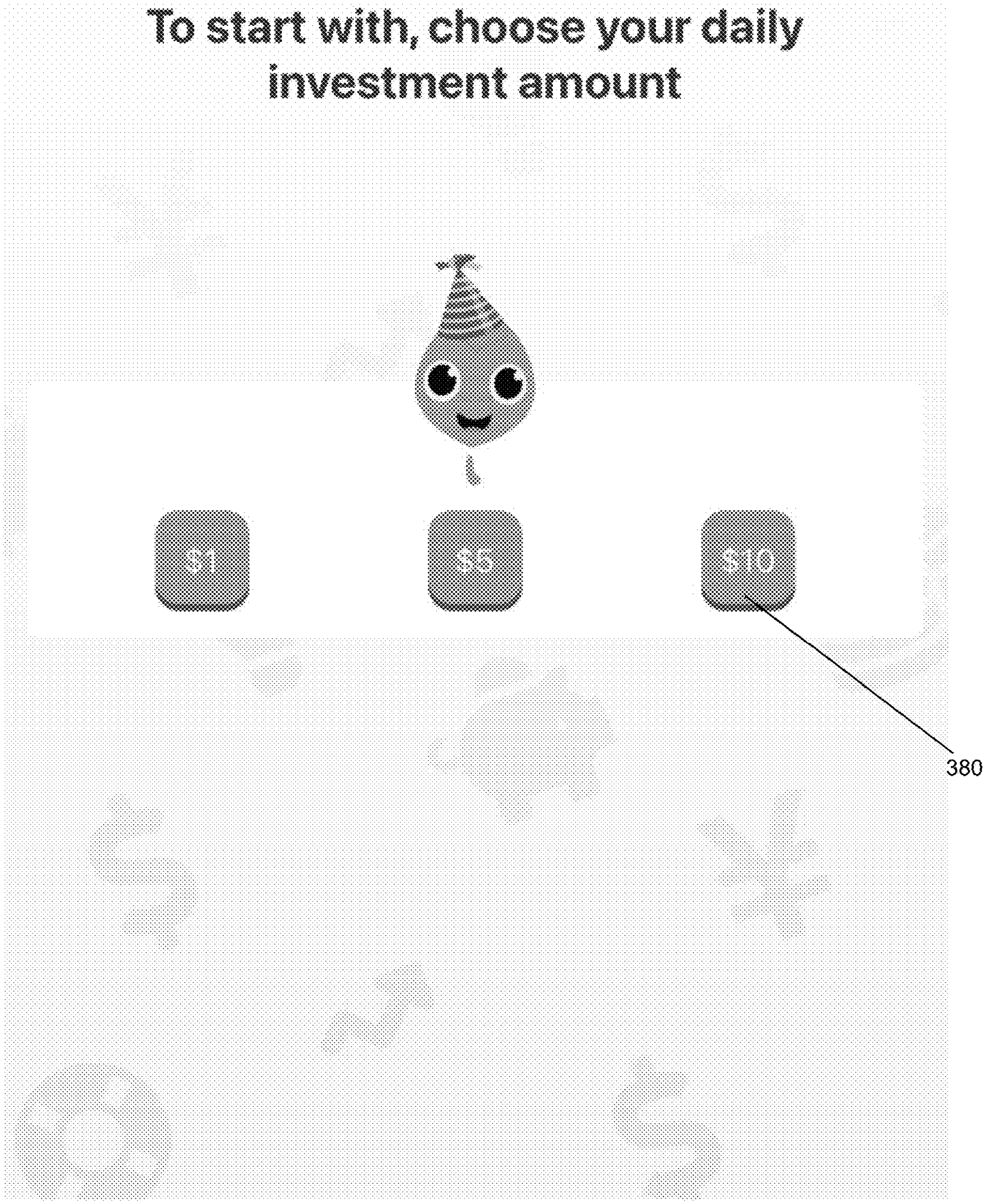

Alternatively, as can be seen with reference to FIG. 19, the user may be presented with user selectable buttons 380, each representing different numerical values to invest for each turn within the simulation. As depicted, the user selectable buttons 380 for investment amount is shown here as daily investment amounts options of $1, $5, or $10, and the user selects one of those options for operation of the financial simulation within the system 100. It is contemplated that alternative values may be provided, and the time period represented for each investment may be for an alternative period of time (e.g. monthly, quarterly, weekly, or yearly).

Figure 20:
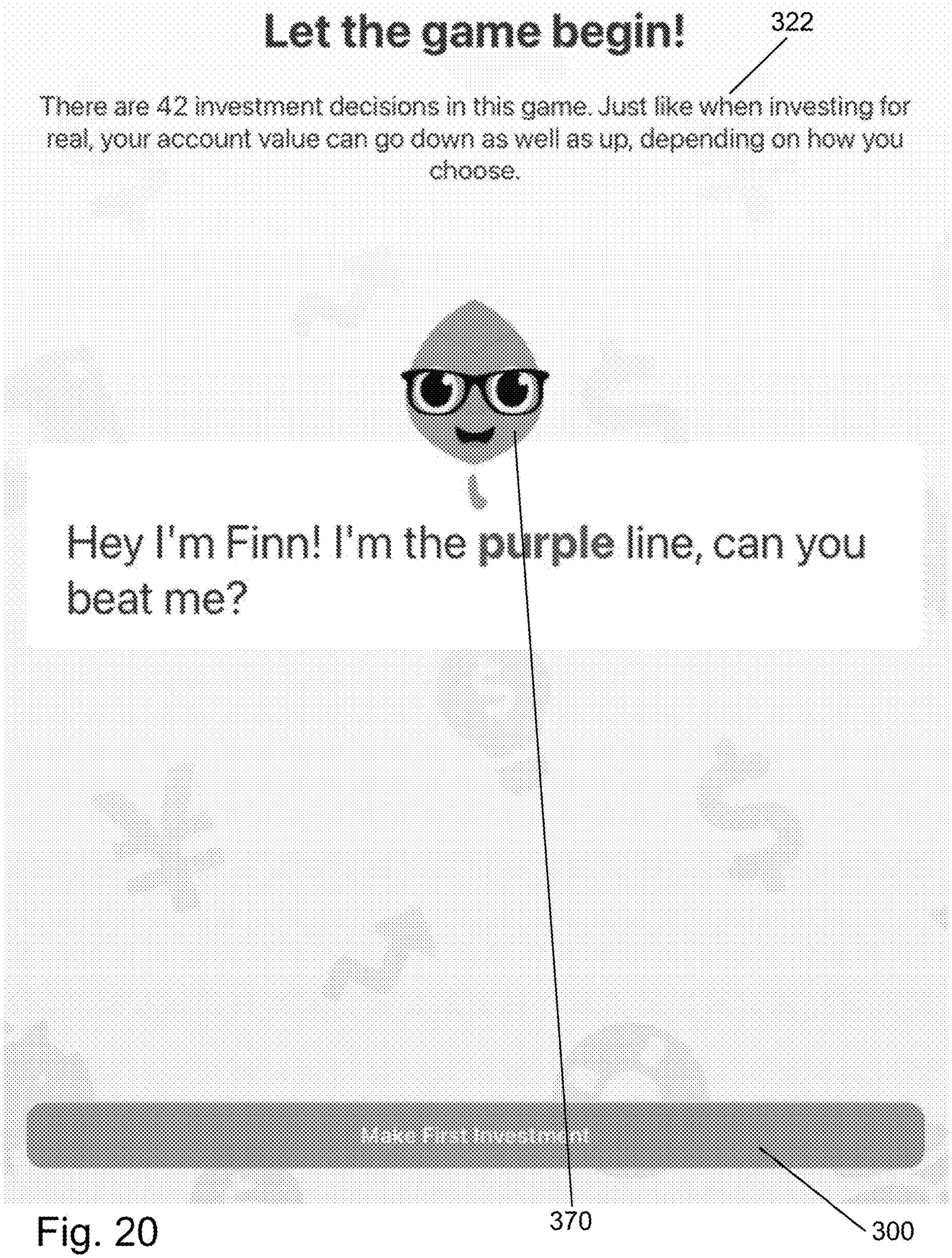

As shown in FIG. 20, the user may be presented with additional information about the simulation. For example, additional instruction 322 may be provided in the form of the following representative text: "There are 42 investment decisions in this game. Just like when investing for real, your account value can go down, as well as up, depending on how you choose." Furthermore, the user may be presented with an animation or character 370 that challenges the user to beat the default selection of buying every turn. The user may then initiate the first turn by selecting the user selectable button in the user action module 300, provided here as "Make first investment".

Figure 9:
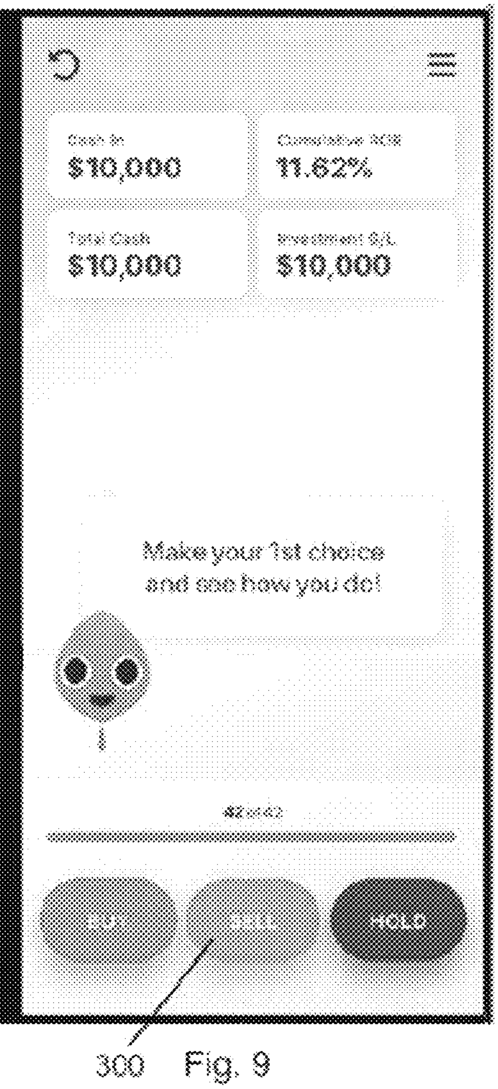
Figure 21:
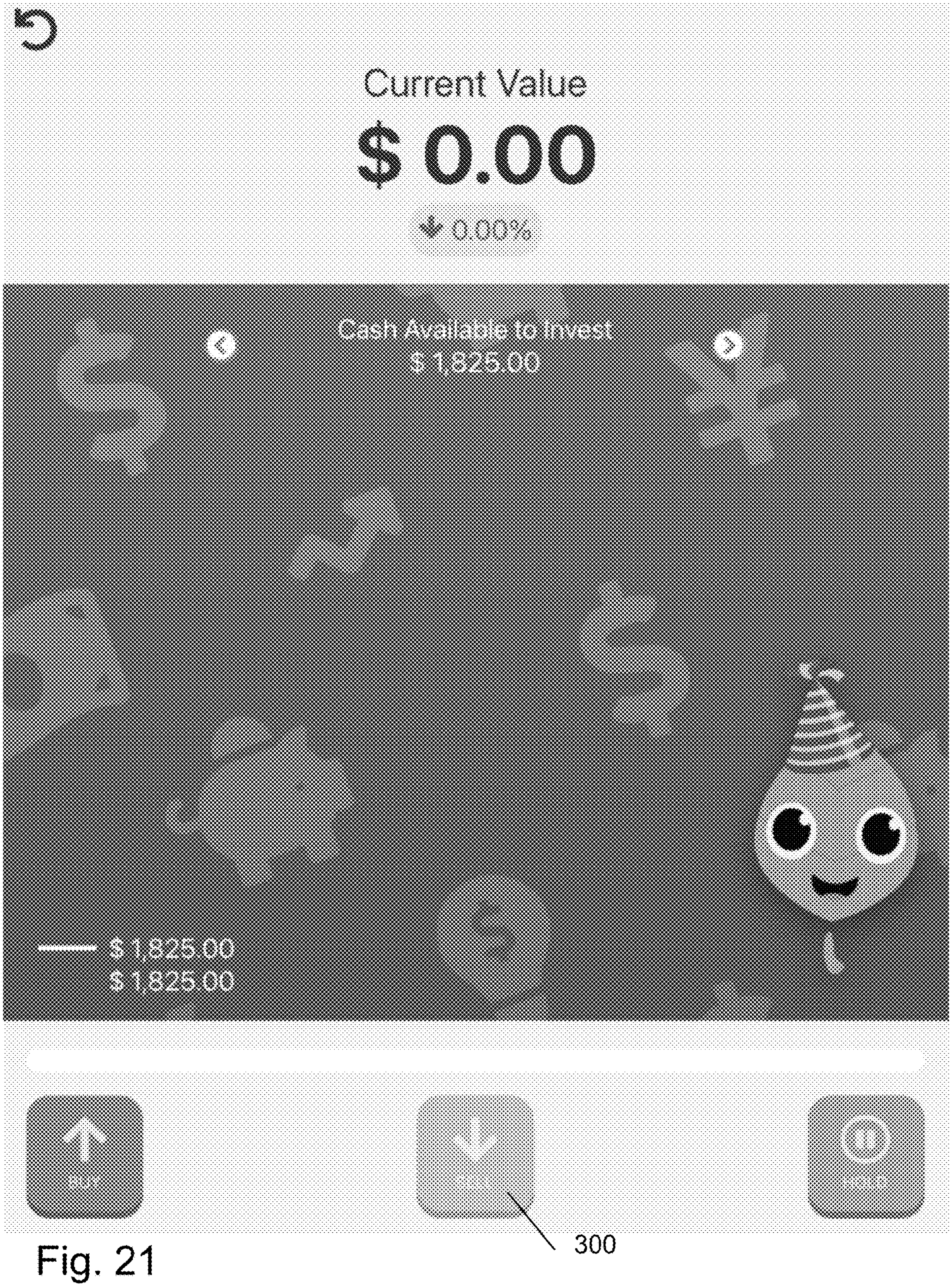

As can be seen with reference to the embodiment depicted in FIG. 9, at the start of the initial turn and each subsequent turn until the completion of the game, the amount allocated for investment for the corresponding turn is automatically deposited in the "Cash In" entry as shown, provided within the available cash module, with the amount representing the cash currently available to be invested for that turn. It is contemplated that the title of the cash in account may be alternatively named any suitable descriptor, for example, the cash account with the amount available to invest for each turn may instead have the descriptor of "Current Cash", or "Cash Available to Invest", as depicted in the embodiment of FIG. 21. For ease of reference, the amount available to the user to invest for the instant turn may be referred to as the cash account. Notably, amounts retained within the cash account are secure from loss, but also will not benefit from gains, and are unaffected by stock market fluctuations.

As shown in FIG. 21, the initial starting value of the cash account, at the start of the first turn, has a current value of $0.00, and no change in the value of the account, as a percentage. The cash available to invest for each turn is the selected value, multiplied by the period frequency indicated for that value. In the embodiment represented by FIG. 19, the period frequency is indicated as daily investment. Thus, the amount selected by the user for the daily contribution to invest is to be multiplied by 365 days to represent one year, where one turn is simulating one year. In the case where the user has selected a value of $5 to invest daily, the starting cash available to invest will be $1825 ($5×365 days simulated), as depicted in FIG. 21. Similarly, selection of $1 to invest daily will result in the system having $365 dollars to invest for each turn that simulates a year, while section of $10 to invest daily will result in the system having $3650 to invest for each turn that simulates a year.

Figure 12:
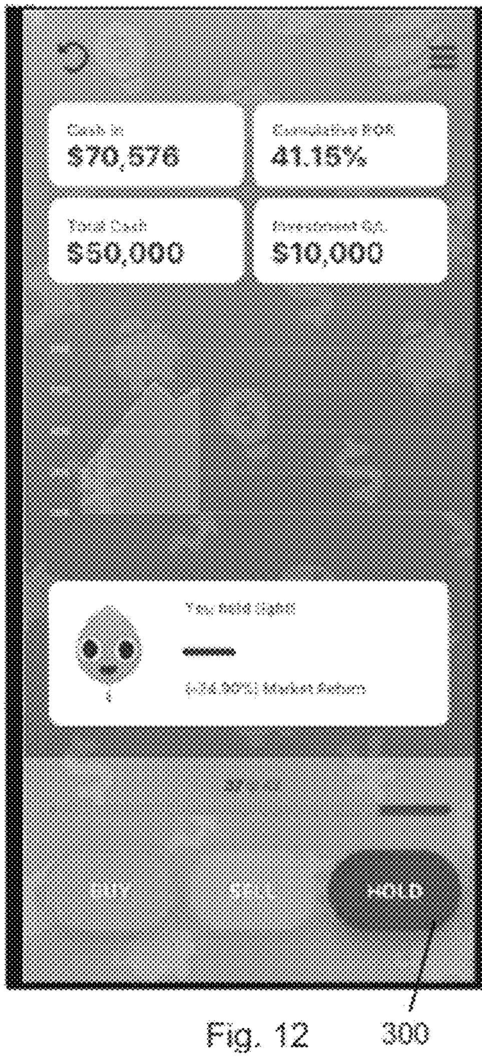

As shown in FIGS. 9-11, the display for the simulation may provide progress module, which may be, for example a turn counter, which may indicate the remaining number of turns in the simulation. Alternatively, the turn counter may count up to the last turn and begins with an initial turn of "0" of the total number of turns and increase consecutively for each turn. As depicted in FIG. 12, an exemplary value for the turn counter is provided, in this instance indicating the user is on turn "37 of 42" turns. In the embodiment depicted in FIGS. 22-27, the progress module, instead of a numerical counter to indicate the advancement through the simulation, there is provided a progress bar that indicates advancement through the turns of the simulation by progressively shading a portion of the progress bar, as will be familiar to those of skill in the art. Note that FIG. 21, which is the presentation of the initial turn, and not yet having completed the initial turn has no indicated progress in the location where the progress bar can be seen in the FIGS. 22-27. Progress through the turns of the simulation can be seen depicted in the shading of the progress bar when comparing the FIGS. 22-27, with FIG. 22 indicating the completion of only the first turn, and FIG. 27 indicating progress through most of the turns (approximately ⅔) of the simulation. Upon completion of the last turn of the simulation, the progress bar would be fully shaded to indicate the completion of the turns.

As shown, with reference to FIGS. 10-12, 14 and 15, the display may feature an animated object or character 370 presenting instructions for the instant turn, though for subsequent turns, and upon completion of the simulation, the animated character or object 370 may provide performance feedback to the user, indicating the outcome of the most recent previous turn or the simulation. In this embodiment, the animated object 370 displayed may be an animated leaf character as shown, though it is contemplated that alternative characters may similarly be employed. The animated object may be varied in one or more characteristics, either on user preference, or based on game play, as will be discussed.

The current value module is provided on the display to indicate the current value of the user's account. The performance feedback module is provided for each turn on the display to indicate current statistics relevant to the simulation, such as can be seen in the current value module, the performance feedback module, the available cash module, the returns module. The current value module provides an indication of the total value of the user's account within the simulation. The available cash module indicates how much the user has available to invest in the current turn. The returns module provides feedback on the performance of the user's account through the prior turn, indicating for example, the cumulative rate of return and investment gain or loss for the just completed turn.

Figure 22:
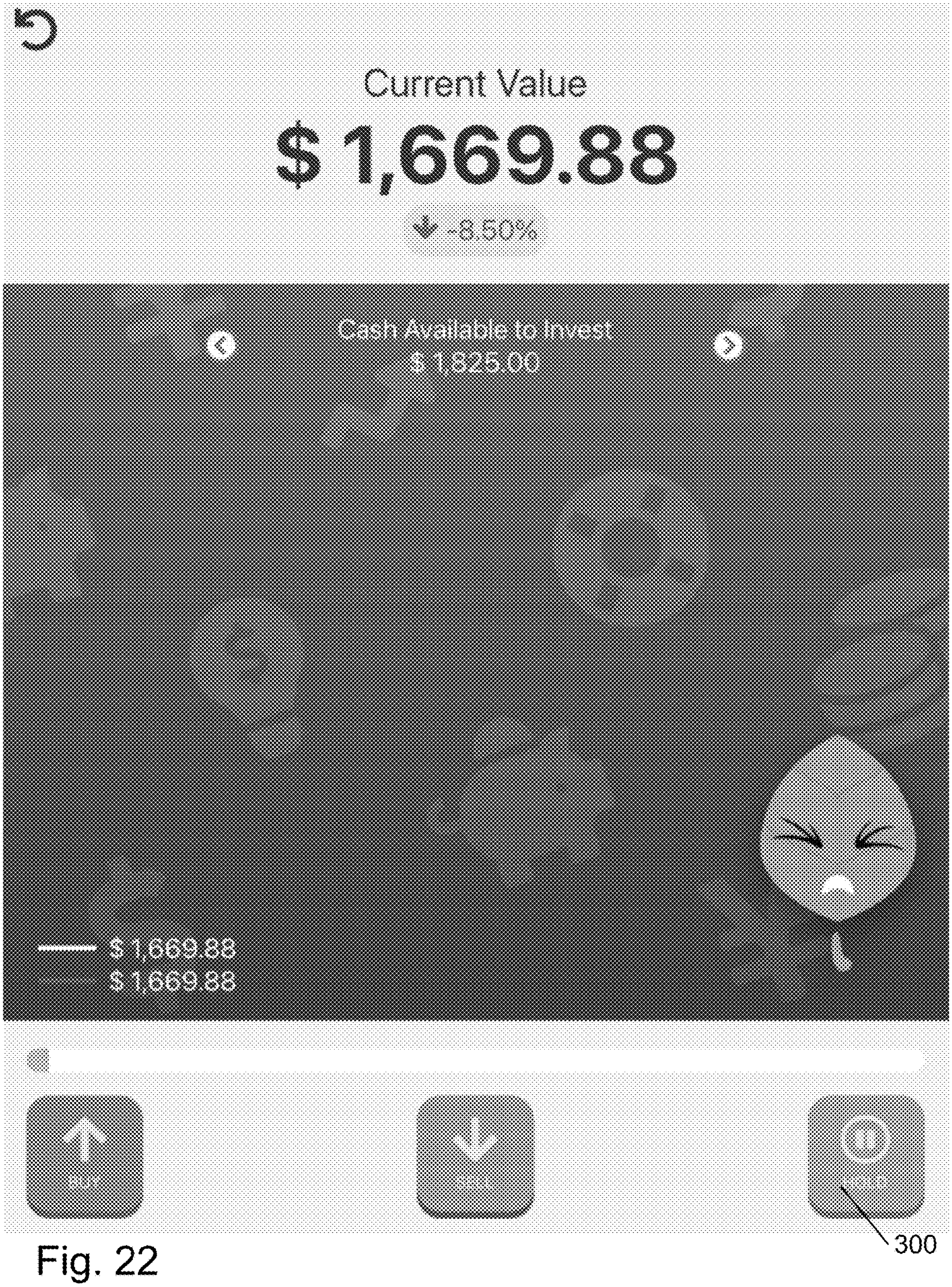
Figure 24:
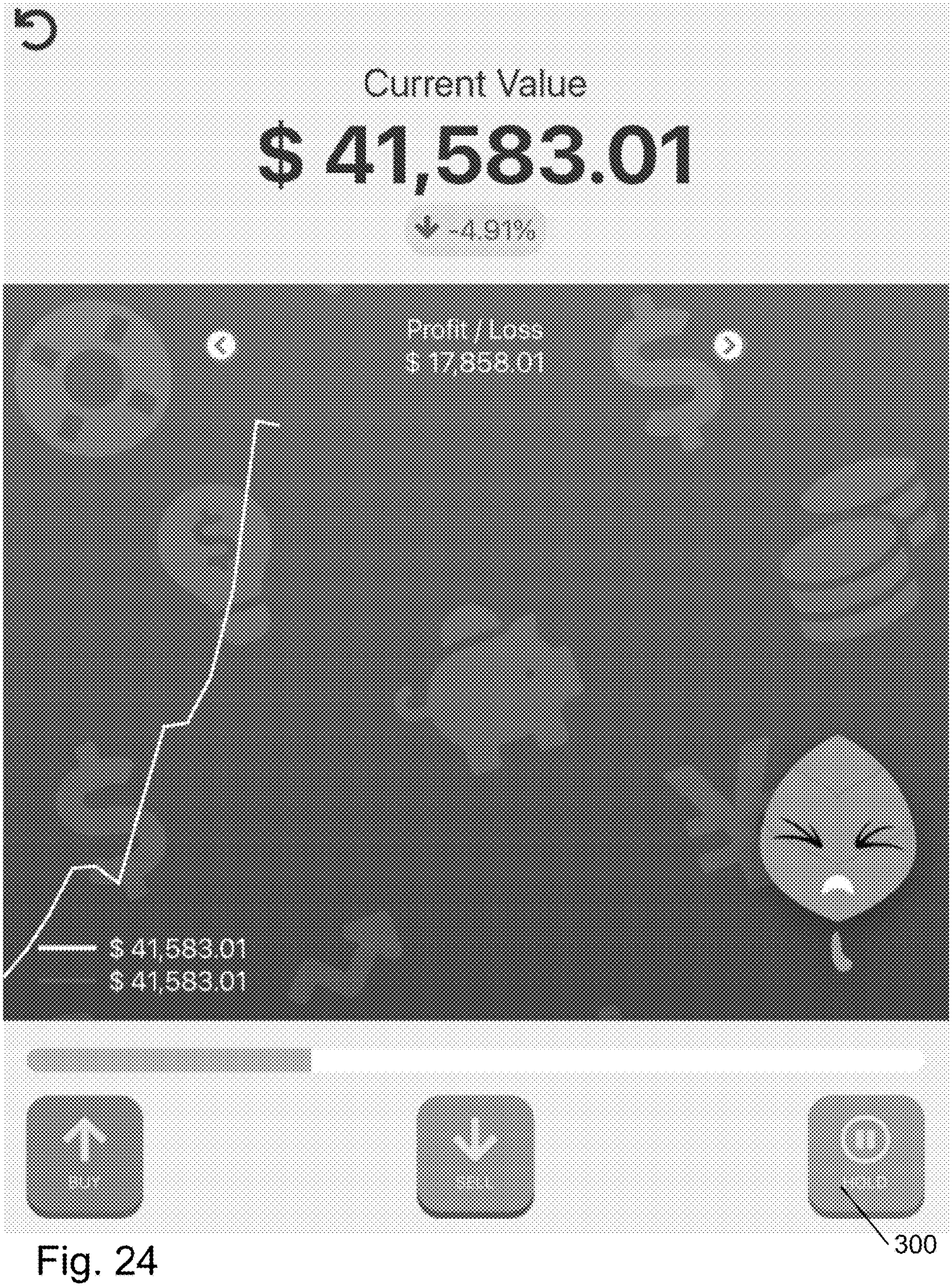

In the embodiment of the game play, as depicted in FIG. 22, the simulation 100 provides in the current value module an indication of a reduction in value of the account, as the simulation applied a market downturn for the just completed previous turn, with a market return of negative 8.5% for the simulated year, and the current value being reduced by the same percentage. In FIG. 24, the return for that turn is a negative 4.91%, while in the FIG. 25, the return is a positive 31.69%.

Figure 23:
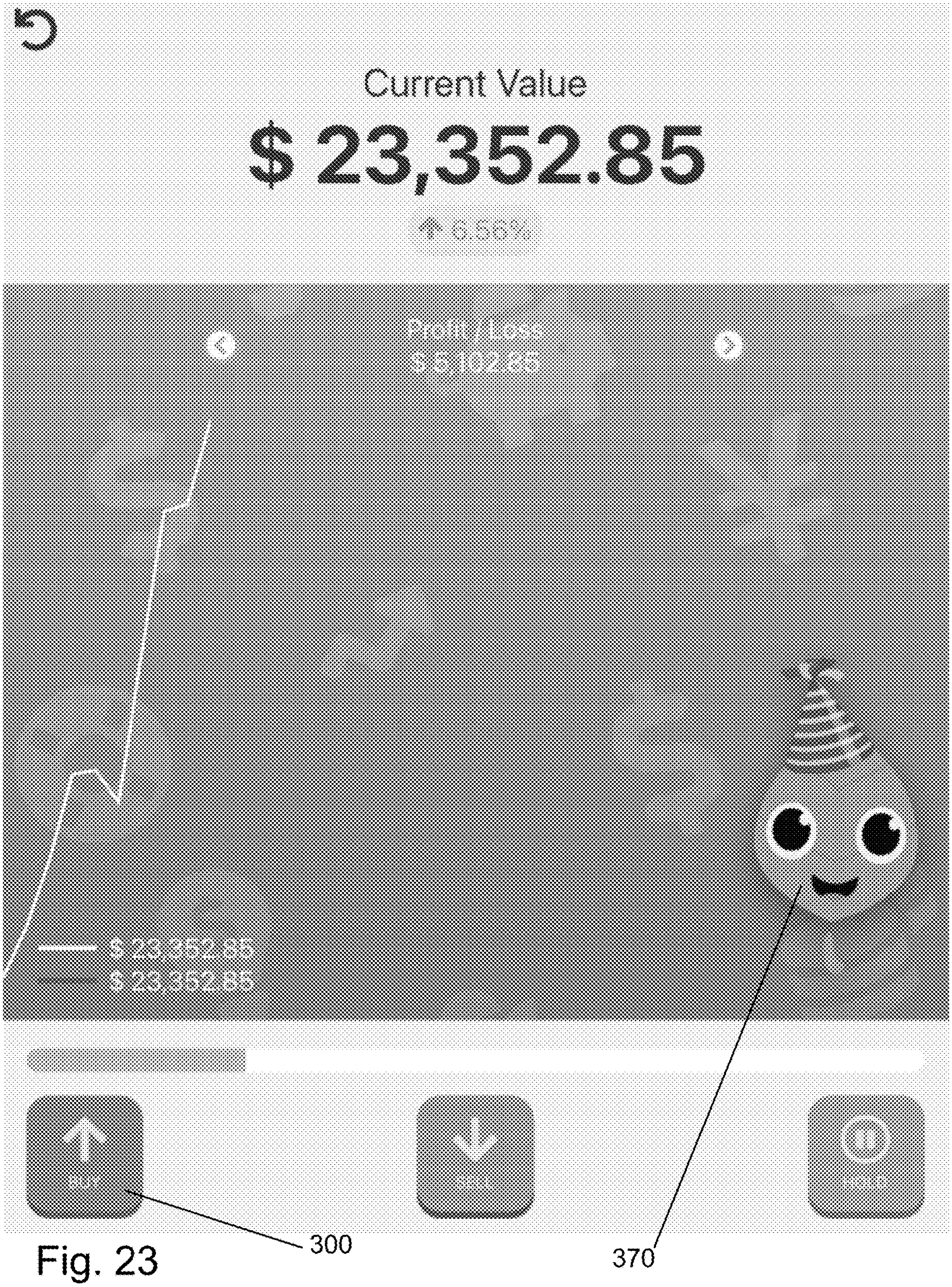

The animated object or character 370 displays a facial expression corresponding to the results for the user's investment selection for that turn. A loss in value, as depicted in FIG. 22 results in the animated object or character 370, in this case the animated leaf character Finn, having a sour or pained expression. An increase in account value would depict the animated character 370 (e.g., Finn) having a smile or happy expression, as depicted in FIG. 23, and also in FIG. 25.

Figure 25:
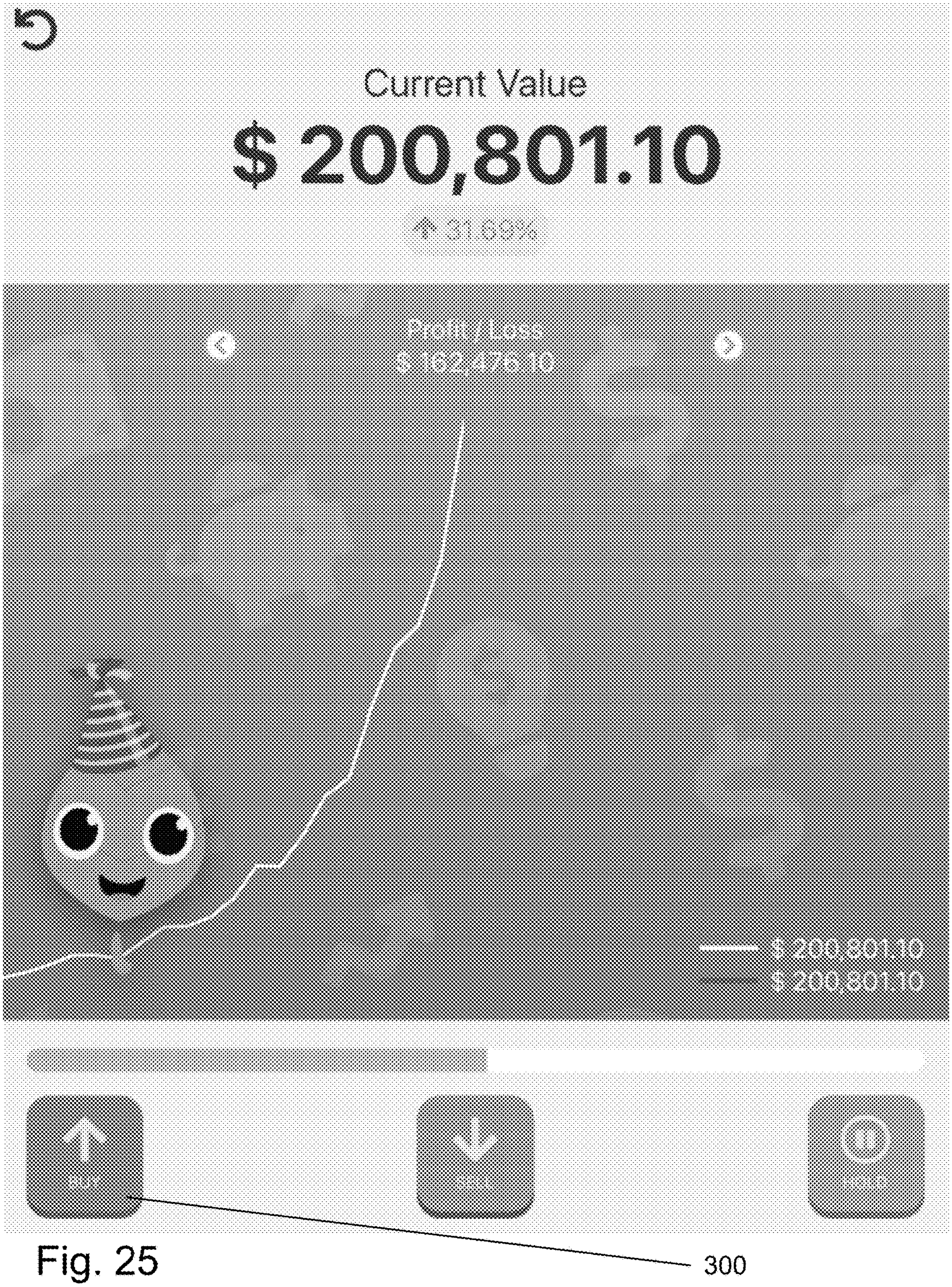
Figure 26:
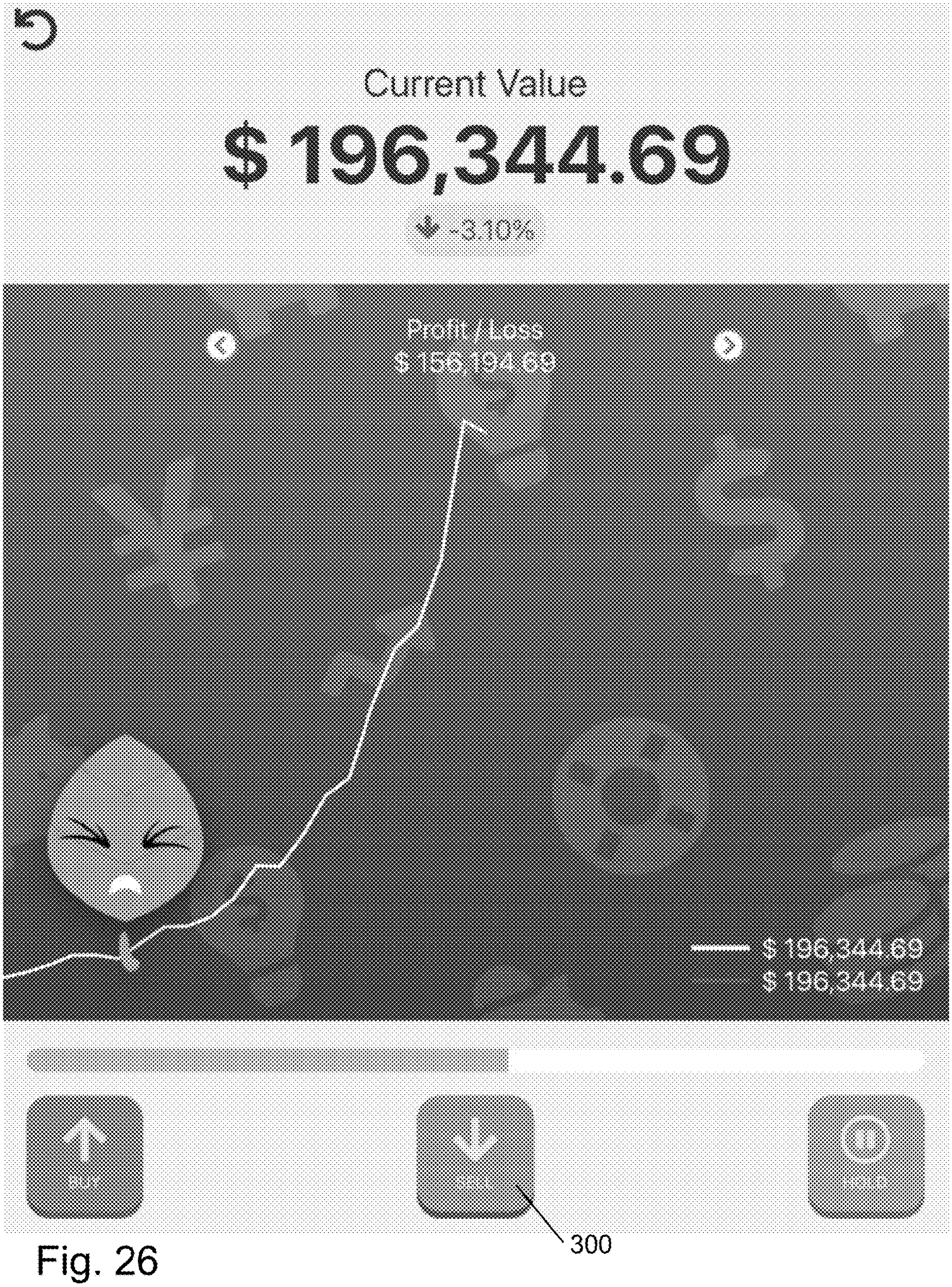
Figure 27:
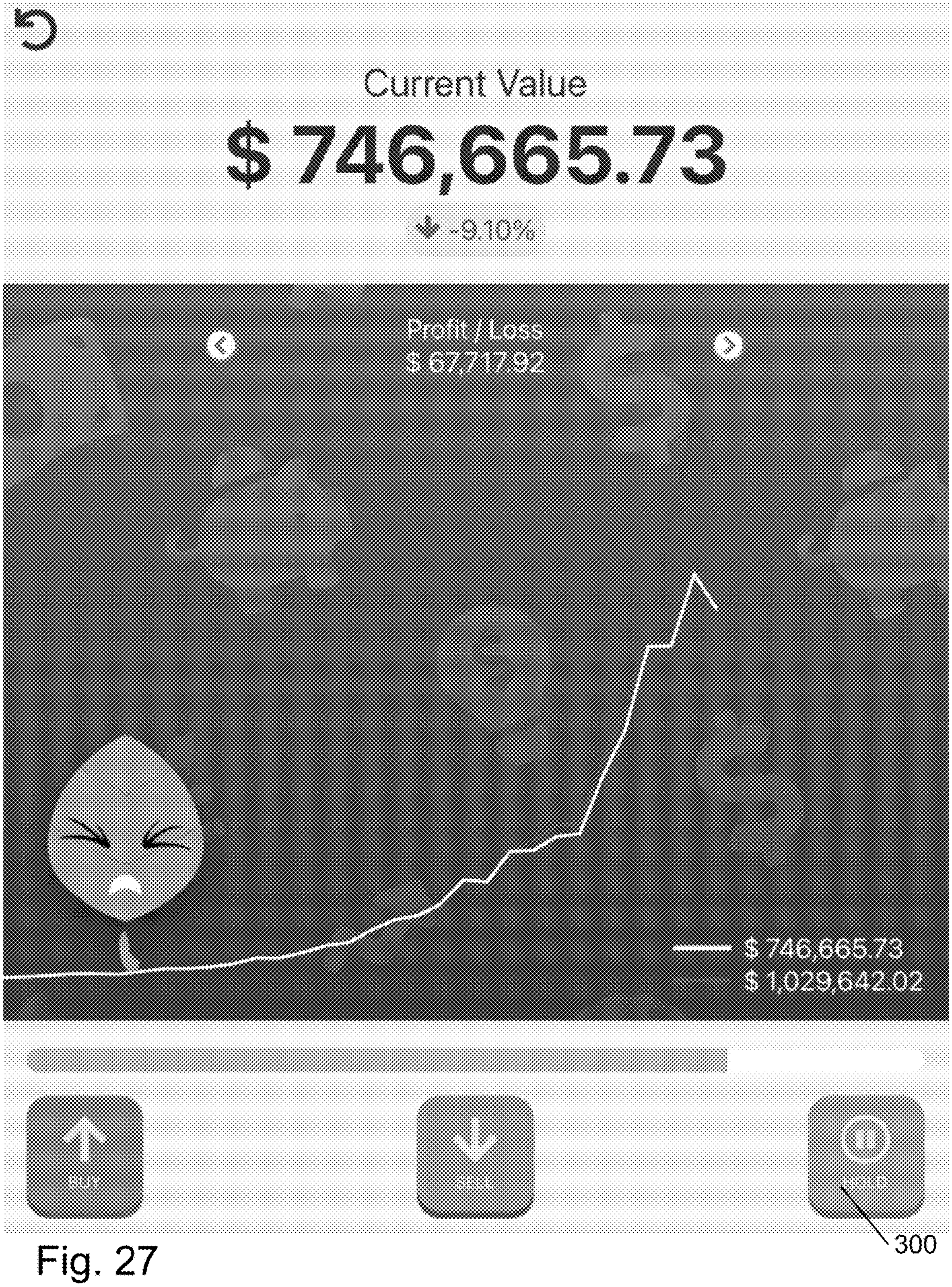
Figure 28:
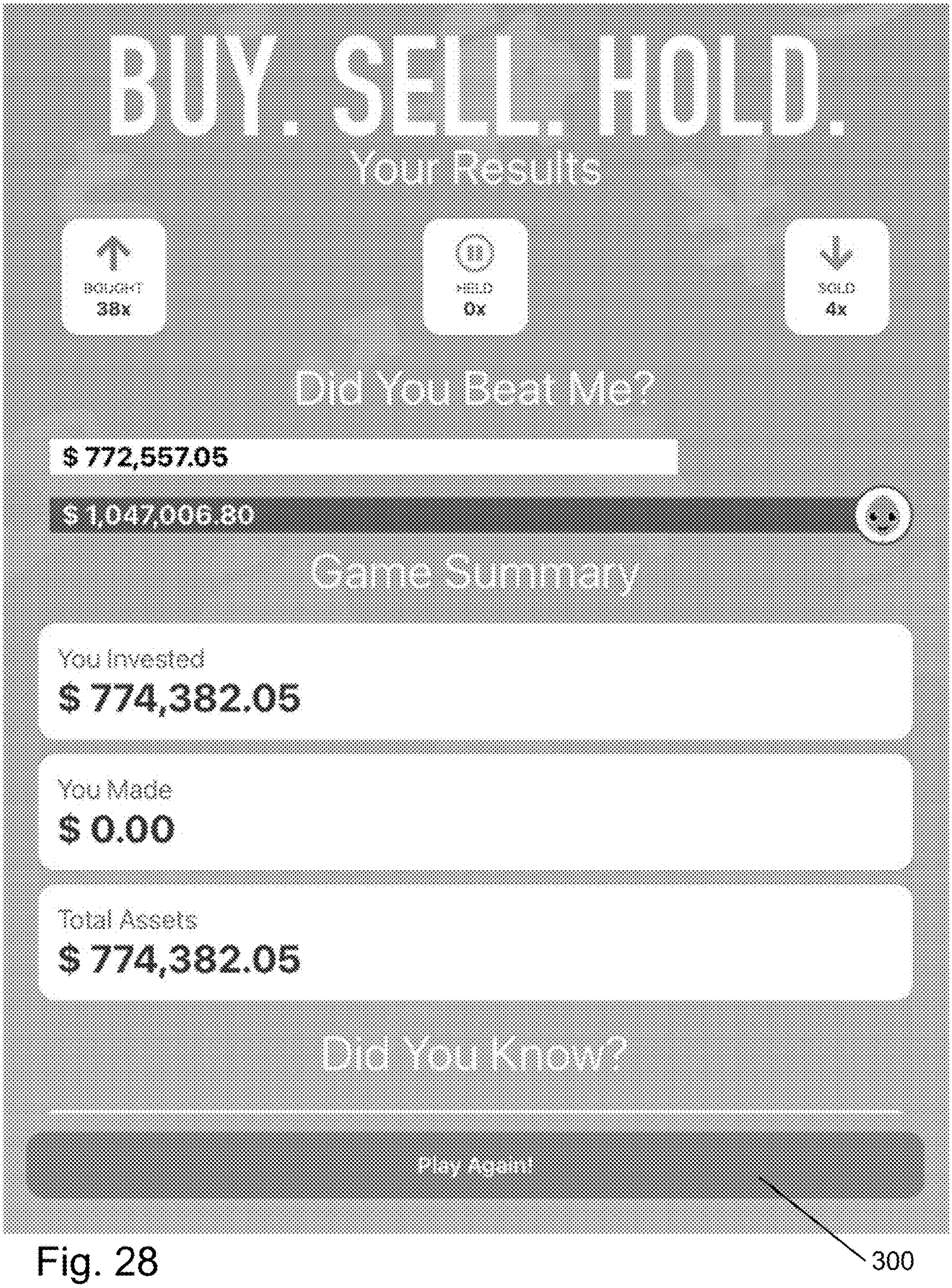

In an embodiment, it is contemplated that performance feedback provided through the performance feedback module, to the user may additionally be provided by the background coloring provided on the page, such that the color of the page or at least the results graph may be varied with account performance. For example, red coloring may be provided to indicate large losses, as depicted in FIGS. 22 and 27, blue to indicate only a small loss (for example, a loss with a return lower than 0%, but better than or equal to negative 5%), as depicted in FIGS. 24 and 26, or small gain (for example, a gain between 0 and up to, and including 5%), and green to indicate a large gain (for example, exceeding a 5% return), as depicted in FIGS. 23 and 25.

To proceed with the simulation, the user is asked for each turn to make a selection within the user action module 300, to choose one of "buy", "sell", or "hold", by selecting the appropriate button on the display. As can be seen with reference to the embodiment of FIGS. 9-12, the user action module 300 provides for the display of a user selectable button for each of "Buy", "Sell", or "Hold". Similarly, as can be seen in the embodiment of FIGS. 21-27, the user action module 300 also provides user selectable buttons for each of "Buy", "Sell", or "Hold", along with the symbols for each within the user selectable button. In either embodiment, where the user selects the "buy" button, the entire amount of the cash account that would be available for investing is directed into the stock market fund to complete the users turn. In an embodiment, the amount the user has invested in the stock market may be displayed by the current value module, for example, with the identifier of "Cash Invested", "Cash In", or "Current Value", or any other suitable identifier that indicates to the user the amount that is in the account and may be affected by positive or negative growth due to the market fluctuation. Where the user selects the "hold" button, the entire amount in the cash account, that would have otherwise been available for investing, is instead maintained in the cash account for the next turn, and not invested into the market fund. In the embodiment of FIG. 21, the amount in the cash account is depicted within the available cash module, shown here identified as "Cash Available to Invest". Where the user has opted to "hold" by selecting the hold button in the user action module, at the start of the subsequent turn, the cash account will be increased by the amount previously selected to be available for investing for each turn. In the initial turn, and where the user has no amount invested in the market, the user is unable to select the "sell" button, as there would not be any investment in the market fund to sell; however, for the remaining turns where there is an amount invested in the market, the user may select the "sell" button, whereupon the entire invested amount in the stock market would be sold at the current value, and the amount directed to the cash account for the start of the next turn.

For each turn in the simulation, the user makes the selection in the user action module, choosing from the provided options of Buy, Sell, or Hold, as described above. After the selection is made, this completes the user's action in the turn, whereupon the system will perform the appropriate action of directing amounts to the proper account and performing any needed calculations to reflect the change in value for the invested amount, if any. The system will calculate the change in value in the invested amounts based on the assigned market performance for each turn, which may be a market change value assigned by the system for each turn, determined either randomly, or using historical data, or a combination of both, as will be discussed. The market change value would be provided as a percentage change, which is multiplied by the amount invested in the market, to arrive at the revised invested market value for the next turn. For example, where the user has $10,000 invested in the simulated market, and the system indicates the market return to be applied was 8% growth, the resultant market value at the start of the next turn be increased by $800 ($10,000 current value*0.08 change=$800 growth). Thus the new market account at the start of the subsequent turn would be $10,800 ($10,000+$800). Thus, the formula utilized for amounts invested in the market is Current Market Value multiplied by the assigned market change percentage. That calculated amount is added to the current market value to provide the new market value going forward into the next turn. Similarly, where the market performance assigned by the system is a decrease, the resulting amount from the formula of current value multiplied by the negative percentage change would be a negative value, resulting in a decrease when added to the current value to arrive at the new market value going into the next turn.

With the revision applied to the market value of the invested amount, the turn is completed, and the subsequent turn may begin by displaying the revised current values of the cash account (increased by the amount available to be invested for the turn) and the new invested account, at the start of the next turn, and prompt the user to make a choice for the desired action, as described previously.

Each subsequent turn follows, with the user choosing whether to buy, sell or hold, as previously described, until the final turn is completed, at which point the system calculates the sum of the investment account and the cash account, to arrive at a simulated net value.

When the last turn is completed, and the rate of return for that turn is applied to calculate the new market value, this calculated amount will be the end value for the invested account at the end of the simulation. The final invested amount will be summed together with any amount not invested to provide a total simulated net value for the user at the end of the simulation.

As can be seen with reference to FIGS. 10-12, a results module may be provided, that includes a graphical conversion module that prepares a visual depiction in the form of a graph provided on the display in order to present a visual indication of the changes in account value as the user progresses through the simulation. The results module may also include the numerical values for the "Cash In" account, the "total cash" account, and current turn results in the form of the cumulative rate of return, and a summary of the investment gain or loss, as shown in FIGS. 9-12. Alternatively, the turn results module may be as depicted in FIGS. 21-27, where the "Current Value" is depicted, as well as the rate of return for the prior turn. Additionally, the turn results module may provide the cash available to invest, the Profit/Loss, and current rate of return, calculated as a percentage. Using the arrows located in the display, the user may select which format of the turn results module is to be displayed and varying between any of "Cash available to invest", Profit/Loss, and current rate of return. In an exemplary embodiment, the graphical conversion module provides a graph that features an "x" axis in a horizontal orientation, and corresponding to the passage of turns in the simulation (and progress within the graph may be aligned with the progress indicated on the progress bar, as can be seen with reference to FIGS. 23-27), where each turn represent the passage of a period of time, such as a year, month, week; and the "y" axis in a vertical orientation corresponding to the monetary value of the user's account, calculated by determining the sum of the cash account and the market account at the end of each turn. The assignment of the axes in the graph may be varied, and still convey useful information regarding the simulated financial history. In an embodiment, the user can select which elements are to be displayed within the results module or may select a scale for each axis to be displayed. It is contemplated that the graph may be any suitable form for displaying progress, including line graphs, bar graphs, scatter plots, as non-limiting examples.

In an exemplary embodiment, provided on the display of the simulation, may be feedback for the user, which may be depicted as being provided by an animated character, as shown in FIGS. 10-12. In an embodiment, the feedback provided by the animated character is presented between the completion of any one of the turns in the simulation and, prior to the start of the subsequent turn. Alternatively, the character may be displayed during the course of the turn, as depicted in FIGS. 10-12. The character may provide one or more of visual text feedback, or auditory feedback, optionally with facial features on the character, or character movement corresponding to the dialog or nature of the feedback provided. The character displayed may be user selectable or customizable by the provider of the simulation to the user. In an embodiment, the character is a simulation mascot depicted as the leaf character "Finn".

In an embodiment, the user may be provided with, or may select an avatar or representative character that appears in the simulation, for example, on the leaderboard, to represent the user within the simulation. Alternatively, within the simulation, the user's avatar may appear on the display. The user's avatar may be fixed, or alternatively capable of transforming, for example, where the avatar is provided to begin at an initial level and may transform or grow as the user completes iterations of the simulation, or as the investment or total account values increase. For example, the user's avatar depicted initially may be a leaf, and as the user completes the simulation, achieves growth in account values, achieves progress milestones, or collects points for completions of the simulation, the character may grow or transform, for example, indicating user progress, reflected by the character transforming from an initial shape of a character, for instance, as a non-limiting example, a leaf, then to a sapling, and onto progressively larger forms, ultimately reaching the status of a fully leafed large mature tree, for example a redwood or oak tree. The user may select alternative character avatars for which various stages of advancement are presented in the system. Non-limiting examples of the character may be animals, cartoon characters, or objects. Additionally, rewards for achievements may include unlocking features, skins, or color schemes for any of the embodiments described herein. To encourage use of the simulation, the points may be redeemed for prizes, such as may be made available by the provider of the financial education curriculum or the simulation, or alternatively, from entities that advertise in, or sponsor the simulation. Character selection and digital display and development may be as described in Applicant's U.S. Provisional filing No. 63/005,872, filed on Apr. 6, 2020, whose contents are incorporated in their entirety herein.

Figure 13:
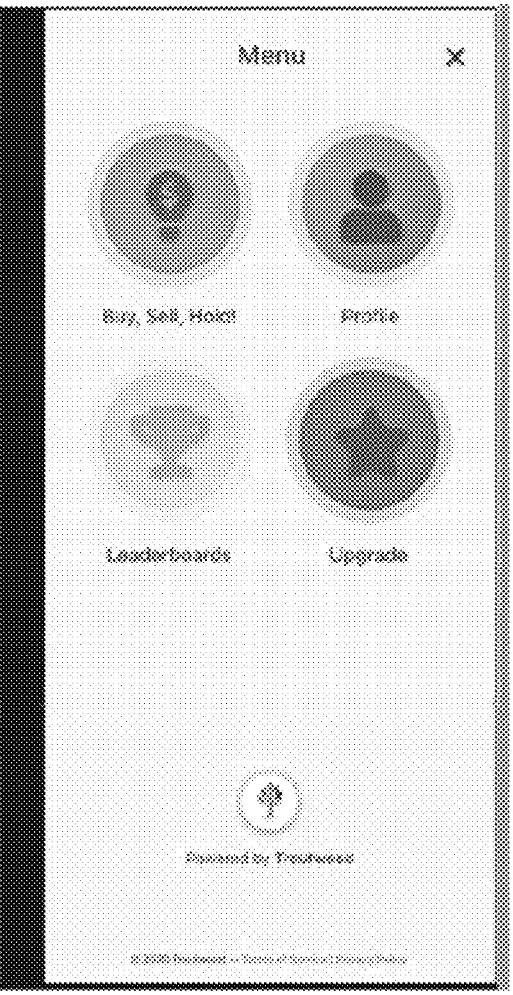

Within the simulation, the user may select the menu module, which brings up the menu display. The menu module may be selected by the user selecting the 3 stacked lines depicted at the upper right corner of the FIGS. 6-12, at any point before, during, or after the simulation, may bring up the menu as depicted in FIG. 13, with links on the menu screen to create or edit a user's profile, see leaderboards, upgrade the simulation service, and select information about the Buy, Sell, Hold simulation. It is further contemplated that additional button links may be provided, either on the menu screen, or on the main display during the simulation, allowing the user to share the simulation, such as by messaging or emailing a link to the simulation to others, or alternatively to share results from the simulation to others, or provide links to post the user's results to social-media sites. Alternatively, links to educational resources, or additional game or service offerings may be provided as well, for example, linking to other Troutwood services or financial literacy information and games that the user may wish to explore.

Figure 15:
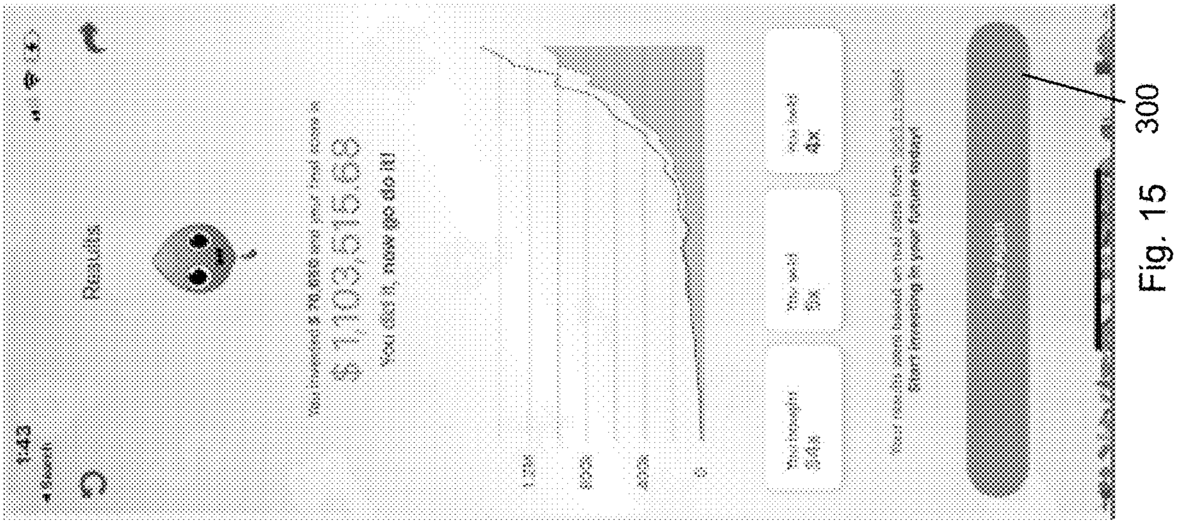

Upon completion of the simulation, the performance summary module provides the results of the simulation, causing them to be displayed, for example, as depicted in FIG. 15, and further may be optionally depicted in chart form, along with appropriate feedback and/or encouragement. An alternative performance summary module can be seen with reference to FIG. 28, providing a chart in the form of a bar graph providing the result of the user's performance in the simulation, and further providing the benchmarking results. The performance results module thus indicates the user's cumulative return from investing, and indicates whether the user outperformed, underperformed, or matched the benchmark performance. Additionally, the performance summary module may provide details of the amount the user invested, the amount the user made, and the total assets. As can be seen with reference to FIGS. 28 and 15, statistics regarding the user's choices during the simulation may also be provided, providing the number of times the user opted to "buy", "sell" or "hold". For example, in FIG. 15, the user within that simulation bought into the market thirty-four times, sold out of the market five times, and opted to hold four times. Additionally, the performance summary module may provide details on the historical market period that was applied. For example, the system may inform the user that the market returns for the simulation correspond to the market returns for historical data and identify the set of years from which market returns were utilized in running the simulation. Thus, the user may gain comfort and confidence in understanding that the performance and gains in the simulated portfolio have some relevance to real life returns, due to the simulation being based on historical performance.

Additionally, it is contemplated that, in order to encourage gameplay, and competition among users, the system may provide a way to recognize and compare user performance. For example, the system may provide badges, awards, or personalization to the characters in recognition of user performance that achieves set milestones, such as cumulative returns exceeding a threshold value, or recognition of long streaks of consecutive investment turns that do not incur a loss, as non-limiting examples. Furthermore, the system may provide a leaderboard that allows the user to track performance of a user's simulation, or series of simulations against a collective group of other users. For example, a universal leaderboard that provides performance information on simulation returns for all users of the simulation. Alternatively, the leaderboard may compare a user's performance against a cohort of users, for example, members of a class on investments, or a group of friends or contacts. In an embodiment, the leaderboard may provide information on a cohort of users that is local, regional, or national or international in scope. In an embodiment of game play, the cohort of users, such as a financial or investment-oriented class, may compare their respective scores against the teacher of the class. Alternatively, the leaderboard may display the scores of a featured participant, who may be, as non-limiting examples, a celebrity, a politician, a state treasurer, a recognizable financial investor or businessperson, athletes, or any other notable person(s) that may drive interest and encourage participation by the population in the simulation. The system may provide a reward, badge, or other form of recognition for those users that are able to achieve a better result score than the highlighted person.

In an embodiment of the simulation, it is contemplated that an administrator (e.g., teacher) may choose the sequence of historical returns that users will play through in the simulation. For instance, if a teacher wants students to play through The Great Depression, the teacher could choose 1928 as the starting year, and during the simulation, the market returns for the subsequent periods (e.g., years) would be applied within the simulation. It is contemplated that the administrator need not be limited to consecutive yearly sequences, but rather, in an embodiment, the administrator could pick and choose from a library of historical rates of return for the market, thus selecting which years or rates to apply in the simulation, and in which order, in order to allow the teacher to tailor the game play to a specific point of understanding that is sought to be conveyed. Thus, the invention beneficially allows the user to experience specific historical scenarios or periods as a unique development of the invention. Such flexibility in applying historical scenarios has not been previously known with prior art financial simulations.

Figure 14:
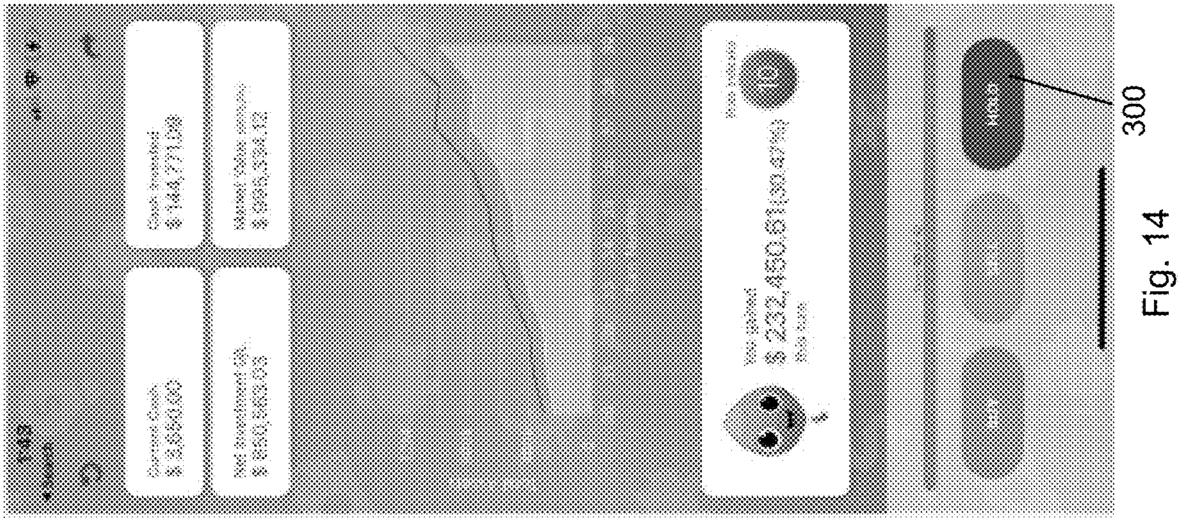

In an embodiment, the user's performance may be compared against a fictional person, such as a system provided benchmark. For example, the system may provide a system character that selects to "buy" in every turn. This "benchmark" fictional person may be a hypothetical investor that the user attempts to outperform. Those skilled in the art will be familiar with "benchmarking" and the practice of obtaining better returns on investments than the benchmark is a skill that can be practiced. The benchmark performance may be provided on the leaderboard, discussed above. Additionally, the benchmark performance may be indicated on the user's in-game performance graph described above. For example, the benchmark may be a provided on the performance graph discussed previously, for example, as a contrasting color, as a non-limiting example, a blue line where the results are displayed on a line graph, and the user's performance may be displayed in contrasting color on the line graph, as depicted in FIG. 14, where the benchmark results are shown slightly outpacing the user's results. Similarly, the comparison of user to benchmark may be provided on alternative graph forms or summarized numerically in the information provided at the end of each turn, or at the end of the simulation. In an embodiment, the system provides a gaming aspect to the investment instruction provided, where the gamification is provided when the user seeks to achieve better performance returns than the benchmark performance, which may be a challenge feature within the system identified as "Beat Finn". In this embodiment, and as depicted in FIG. 20, the benchmark investor is represented by the aforementioned Finn character in the display, and the user competes against the benchmark standard, seeking to improve upon the returns of the representative Finn character, filling the role as the benchmark investor. It is contemplated that alternatively; any suitable character or avatar might be employed to represent the benchmark investor. In an embodiment, the system, at the outset of the gameplay, may provide an introduction to the benchmark concept, and further challenge the user to beat the benchmark performance. In this manner, the user is provided with a competitive aspect, as well as gaming aspect, both serving to increase user engagement as the user strives to beat the benchmark return, while receiving feedback from the Finn character animation within the system, all while the investor is learning about investing in the market and gaining deeper understanding of market performance and variability. The comparison between the user performance in the simulation, compared to the returns from the benchmark strategy employed by the Finn character can be seen with reference to FIG. 27, where the bench marking return on the line graph can be seen to outperform the investment return that has been achieved by the user at the depicted point in the simulation. As can be seen with reference to the lower right of the chart, the user has a market return of nearly $750,000, while the benchmark performance exceeds one million dollars.

In an embodiment, provided within the display during the simulations, such as at the end of each turn, there may be provided feedback to the user, including feedback on the invested amount gain or loss for that turn. Additionally, the feedback to the user may provide an indication of the price/earnings ratio (P/E) calculated for the market performance of the just-finished turn, which the user may take into account in making the investment decision for the next turn. The Price/Earning feedback may be provided in the form of a Price Indicator, as depicted in FIG. 14, which allows the user to have a sense of whether the respective market over-valued or under-valued relative to the historical averages, such as the years the simulation is modeled on 1926-2019), and in an embodiment, whether an individual stock or stock index fund, is over-valued or under-valued, as would be familiar to those skilled in the art. In an embodiment, the price indicator may be presented for each turn as an integer in the range of 1 to 10, inclusive of the endpoints, where the price/earnings ratio has been normalized for the relevant scale. In an embodiment, the simulation may provide, in addition to, or as an alternative to the price indicator value, the calculated price/earnings ratio for that turn, typically provided with one or two significant digits to the right of the decimal point.

The price indicator value may be determined from the historical price/earnings ratio for the relevant market fund, and may be calculated on a yearly basis, and, in an embodiment, may be the trailing value of the previous 12 months for the simulated time period. Alternatively, the simulation may utilize the P/E ratio that is reflective of a point in time during the simulation at which the turn ends for calculating a price indicator. Thus, in an embodiment where the simulation has 42 turns, each turn representing a year of a 42 year simulation, it is contemplated that the price indicator value may be calculated from the trailing value of the previous 12 months of the price/earnings ratio representing the year of that respective turn. In an alternative embodiment, it is contemplated that the price index may be calculated from the ending price/earnings ratio for the end point of the simulated year.

In an embodiment, the price indicator is determined by examining the relevant range of price/earnings ratio for all of the years included within the database. Optionally, the most extreme of the datapoints for the entire range of the price/earnings ratios may be excluded, such as by removing the highest 5 points and lowest 5 points, in order to smooth out the data for the purpose of calculating the price indicator. Then within the remaining values of price/earnings, they may be ordered by value, and the price indicator to be assigned to a given years' price/earnings value is determined by the corresponding decile percentage the price/earnings value falls in; such that a price indicator value of 1 would be assigned for any of the lowest 10% values of price/earning values, the price indicator value of 2 would be assigned for any of the price earning values of 11% to 20%, and similarly, for values of price indicator from 3-9, and finally, the price indicator value of 10 would be assigned to the top 10% values of price/earning values. Within the database of the simulation then, each of the years is assigned a value of 1-10 as the price indicator value, depending on where the price/earnings ratio for that year falls, relative to the other price/earnings ratios in the database.

Within the simulation, the value of the price indicator may be displayed in a manner associated with a color, or displayed on a colored background, such as can be seen with reference to FIG. 14, and such that a price indicator having a relatively high value, for example, a value of 10 may have a color that is red. Alternatively, a price indicator value that is relatively low, for example, a value of 1, may be associated with a color that is green, with the values in between being assigned a color that falls on a gradient between. In an embodiment, the gradient may transition from green to red, as the price indicator value increases, at a mid-point value of the range, for example transitioning from 5-6. In an alternative embodiment, the gradient may be biased, so that the transition from green to red occurs at approximately the $7^{th}$ decile, such that price indicator values of 1-6 are increasingly lightening shades of green (from values 1-6), and values of 7-10 would be increasingly darkened shades of red (from values 7-10). The color shading may allow the user to more easily recognize when a market is trending towards being over-valued, by having a price/earnings ratio that is high. It is contemplated that the color may be provided as a background color in the display where the price indicator value is presented.

In an embodiment, within the simulation, there may be provided pauses, or prompts that are presented to the user between turns. Such pauses might be afforded to allow the user to review the current simulation situation and be afforded to weigh risks. For example, where the simulation is approaching the final turn, the simulation may pause to remind the user that there the final turn is, or final turns are approaching, and allow the user a moment to consider if minimizing risk by removing the invested amount from the market and directing the amount into the safe cash account may be desirable. Thus, the simulation may present the user with an option to reduce risk as the simulation is nearing completion and allow the user to lock in the gains made thus far, albeit foregoing potential gains in the subsequent turn or turns. Alternatively, the pauses may provide for education facts or hints concerning the simulation, allow for advertising, or convey other useful information. In another embodiment, the provider of the simulation may provide prompts that conduct surveys or experiments in behavioral finance, where the user is prompted to make a selection choice to respond to the prompt. In an embodiment, there may be a short duration pause as the simulation completes the penultimate turn, and the user is presented with the question of how much risk the user is willing to take in the final turn. The pause may be of a duration that is greater than 1 second, greater than 2 seconds, greater than 3 seconds, greater than 5 seconds, and may be less than 2 minutes, less than 1 minute, less than 30 seconds, less than 10 seconds, and may be a length between 3 and 8 seconds and may be 5 seconds. In an embodiment, the pause may continue until the user triggers the resumption, such as by responding to the question posed, or selects a user prompt on the display to continue. The question posed to the user during the pause may be presented by the animated character described previously, or may be presented by a celebrity, or other figure, such as benchmark figure described above. The pause may be made in association with advertisement or sponsorship attribution, and may include text, graphical or video content to be displayed. During the pause, the user may be provided with an option to "buy" into the investment account with all of their accumulated assets (both cash account and investment account), or only the amount that is remaining in the investment account or may allow the user to select a percentage (any value of 0% to 100%, inclusive of endpoints) of all of their accumulated amounts, including both cash account and investment account.

The foregoing illustrates some of the possibilities for practicing the invention. Many other embodiments are possible within the scope and spirit of the invention. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A system for presenting a financial simulation comprising a computing device having a graphical user interface, and the simulation providing a plurality of turns during which an option is provided, for each of the plurality of turns to have a simulated amount undergo an action selected from the group consisting of:

a. invested into a simulated investment account;

b. sold from the simulated investment account and directed to a simulated non-investment account; or c. directed to a simulated non-investment account, whereupon any existing invested amount remains in the simulated investment account; and each of the plurality of turns has a simulated market return applied to the simulated investment account to provide a new simulated investment account amount.

2. The system of claim 1, wherein the simulated market return is derived from historical data.

3. The system of claim 2, where the simulated market return for each of the plurality of turns is derived from consecutive periods of historical data.

4. The system of claim 1, wherein the simulated market return is derived from system generated market returns.

5. The system of claim 4, wherein the simulated market return applied is generated randomly.

6. The system of claim 1, wherein the computing device is selected from the group consisting of a computer, a tablet, a mobile device, or portable media player.

7. The system of claim 6, further comprising at least one of a network and server in communication with the computing device.

8. The system of claim 1, wherein the plurality of turns comprises at least 10 turns.

9. The system of claim 8, wherein the plurality of turns is between 10 and 100 turns, inclusive of the endpoints.

10. The system of claim 9, wherein the plurality of turns is 42 turns, each representing a year.

11. The system of claim 1, wherein each of the plurality of turns represents a simulated period selected from the group consisting of a day, a week, a month, a quarter of a year, or a year.

12. The system of claim 1, wherein the simulated amount is a numerical value entered upon beginning the simulation.

13. The system of claim 1, wherein the financial simulation provides feedback on performance for each of the plurality of turns.

14. The system of claim 13, wherein the feedback is visual, and includes at least one graph selected from the group consisting of line graphs, bar graphs, and scatter plots.

15. A method of presenting a financial simulation comprising a plurality of turns, the method comprising the steps of:

a. Providing a system comprising a computing device having a graphical user interface, and presenting a simulated cash account and a simulated investment account;

b. Determining a simulated available amount for each turn of the plurality of turns;

c. For each turn, selecting an option from the group consisting of:

i. Investing the simulated available amount into the simulated investment account;

ii. Directing the simulated available amount into the simulated cash account, and selling any amount in said simulated investment account; or iii. Directing the simulated available amount into the simulated cash account, and maintaining any amount in said simulated investment account;

d. For each turn, applying a simulated market return to any amount in the simulated investment account.

16. The method of claim 15 further comprising the step of providing feedback after each of the plurality of turns.

17. The method of claim 16, wherein the feedback is visual, and includes at least one graph selected from the group consisting of line graphs, bar graphs, and scatter plots.

18. The method of claim 15, wherein the simulated market return is derived from historical data.

19. The method of claim 15, wherein the computing device is selected from the group consisting of a computer, a tablet, a mobile device, or portable media player.

20. The method of claim 19, the system further comprising at least one of a network and server in communication with the computing device.

21. The method of claim 15, wherein each of the plurality of turns represents a simulated period selected from the group consisting of a day, a week, a month, a quarter of a year, or a year.

* * * * *